(12) United States Patent
Tan et al.

(10) Patent No.: US 9,302,334 B2
(45) Date of Patent: Apr. 5, 2016

(54) CUTTING TOOLS FOR CUTTING CURVED AND COMPLEX FEATURES

(71) Applicant: Apple Inc., Cupertino, CA (US)

(72) Inventors: Napthaneal Y. Tan, San Jose, CA (US); Chien-Ming Huang, Shenzhen (CN); Yu Yundi, Dongguan (CN); Zhoujun Lu, Hong Kong (CN)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 13/840,335

(22) Filed: Mar. 15, 2013

(65) Prior Publication Data

US 2014/0069245 A1  Mar. 13, 2014

Related U.S. Application Data

(63) Continuation-in-part of application No. 13/610,838, filed on Sep. 11, 2012.

(60) Provisional application No. 61/689,170, filed on May 29, 2012.

(51) Int. Cl.
*B23C 5/12* (2006.01)
*B23C 5/10* (2006.01)
(Continued)

(52) U.S. Cl.
CPC ... *B23C 5/10* (2013.01); *B23C 3/12* (2013.01); *B23C 5/12* (2013.01); *B23C 5/18* (2013.01); *B23B 2270/26* (2013.01); *B23C 2210/0407* (2013.01); *B23C 2226/31* (2013.01); *B23C 2226/315* (2013.01); *B23C 2240/08* (2013.01); *C25D 11/12* (2013.01); *C25D 11/18* (2013.01); *H04M 1/0249* (2013.01); *Y10T 83/05* (2015.04); *Y10T 83/0524* (2015.04); (Continued)

(58) Field of Classification Search
CPC ........... Y10T 409/303752; Y10T 409/303808; Y10T 409/303864; Y10T 409/30392; Y10T 409/303976; Y10T 409/304032; Y10T 409/304; Y10T 409/088; Y10T 409/304144; Y10T 409/3042; Y10T 409/304256; Y10T 409/304312; Y10T 409/304368; Y10T 409/304424; Y10T 409/30448; Y10T 409/304536; Y10T 409/304592; Y10T 409/304648; Y10T 409/304704; Y10T 409/30476; Y10T 409/304876; Y10T 409/304872; Y10T 409/304328; Y10T 409/304984; Y10T 409/30504; Y10T 409/305152; Y10T 409/305208; Y10T 29/47; B23C 3/12; B23C 2220/28; B23C 2270/06
USPC .................. 409/131–174, 183–218; 29/90.01; 407/33, 40, 43, 46, 53, 51
See application file for complete search history.

(56) References Cited

U.S. PATENT DOCUMENTS 2,102,707 A * 12/1937 Holhut ...................... B23C 3/05 408/233
4,411,564 A * 10/1983 Johnson .................. B23C 5/109 407/113

(Continued)

*Primary Examiner* — Daniel Howell
*Assistant Examiner* — Nicole N Ramos
(74) *Attorney, Agent, or Firm* — Downey Brand LLP

(57) ABSTRACT

The embodiments described herein relate to methods, systems, and structures for cutting a part to form a highly reflective and smooth surface. In some embodiments, the part includes substantially horizontal and vertical surfaces with edges and corners. In described embodiments, a diamond cutter can be used to cut a surface of the part during a milling operation where the diamond cutter contacts the part a number of times with each rotation of the spindle of a milling machine. In some embodiments, a complex feature having planar and curved surfaces is cut into a part.

23 Claims, 20 Drawing Sheets

(51) Int. Cl.
*B23C 3/12* (2006.01)
*B23C 5/18* (2006.01)
*C25D 11/12* (2006.01)
*H04M 1/02* (2006.01)
*C25D 11/18* (2006.01)

(52) U.S. Cl.
CPC . *Y10T 407/1906* (2015.01); *Y10T 409/300896* (2015.01); *Y10T 409/303752* (2015.01); *Y10T 409/304144* (2015.01)

(56) References Cited

U.S. PATENT DOCUMENTS

| | | | | |
|---|---|---|---|---|
| 4,545,706 A * | 10/1985 | Hiroyasu | ............... | B23C 3/055 408/1 BD |
| 4,662,801 A | 5/1987 | Kondou et al. | | |
| 4,844,670 A * | 7/1989 | Heule | ............... | B23B 51/102 407/9 |
| 4,930,948 A * | 6/1990 | Bowen | ............... | B23C 3/051 408/181 |
| 5,049,011 A * | 9/1991 | Bohnet et al. | ............... | 408/223 |
| 5,063,980 A * | 11/1991 | Schultz | ............... | B23C 3/126 144/218 |
| 6,053,673 A * | 4/2000 | Swift | ............... | B23B 51/10 407/42 |
| 6,217,262 B1 * | 4/2001 | Wright | ............... | B23C 3/12 407/40 |
| 6,474,204 B1 | 11/2002 | Suzuki et al. | | |
| 6,913,424 B2 * | 7/2005 | Yoshihiro | ............... | B23C 5/00 407/113 |
| 7,431,541 B2 * | 10/2008 | Chang | ............... | 407/113 |
| 7,607,374 B2 * | 10/2009 | Hall | ............... | B23B 5/168 407/33 |
| 8,011,863 B2 | 9/2011 | Maurer | | |
| 8,434,974 B2 * | 5/2013 | Spitzenberger | ............... | B23C 5/202 407/113 |
| 2007/0280792 A1 | 12/2007 | Belec et al. | | |
| 2009/0060662 A1 * | 3/2009 | Maurer | ............... | 407/42 |
| 2009/0234490 A1 * | 9/2009 | Suprock et al. | ............... | 700/159 |
| 2011/0117342 A1 | 5/2011 | Sugita et al. | | |
| 2013/0302099 A1 * | 11/2013 | Choi | ............... | B23C 5/08 407/113 |

* cited by examiner

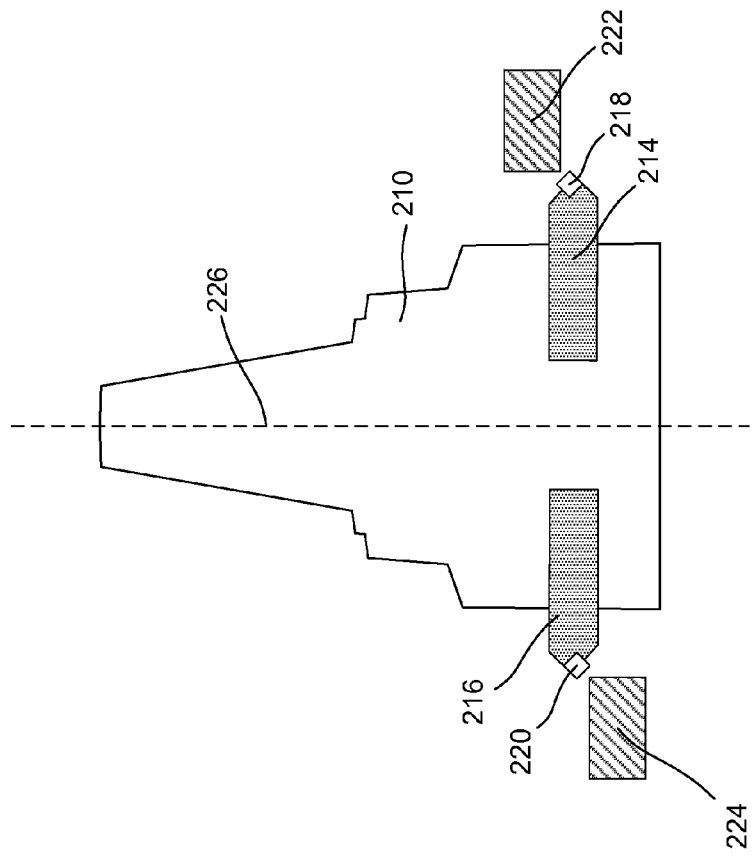
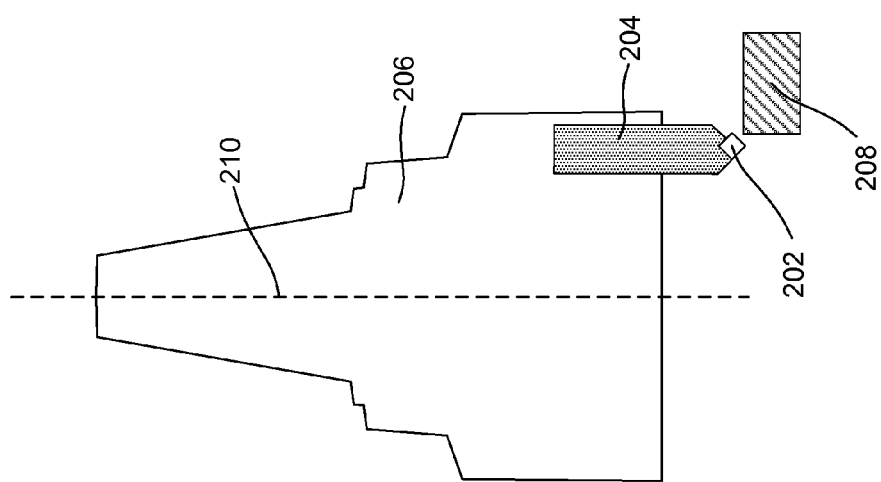
FIG. 2B
FIG. 2A

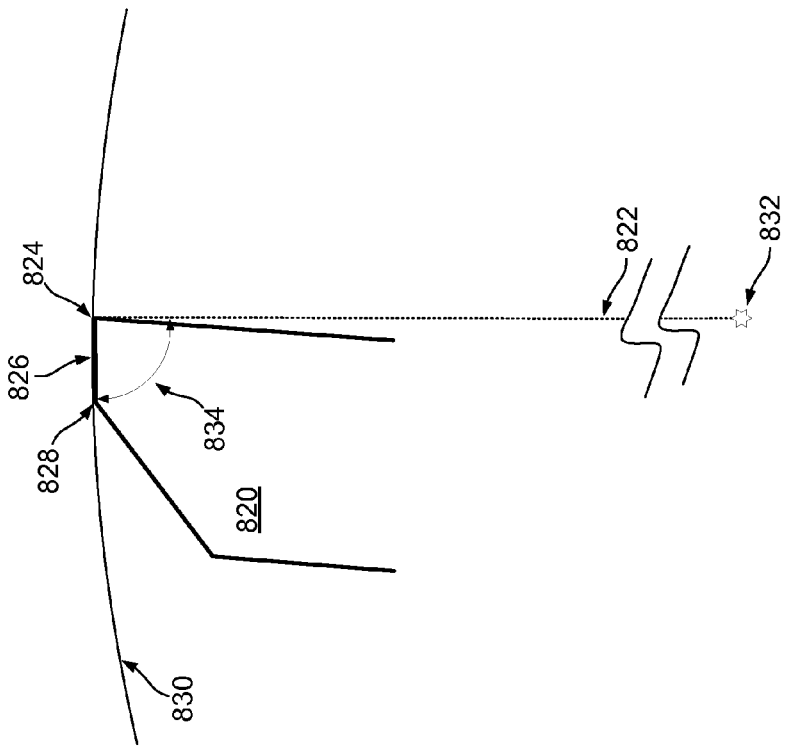
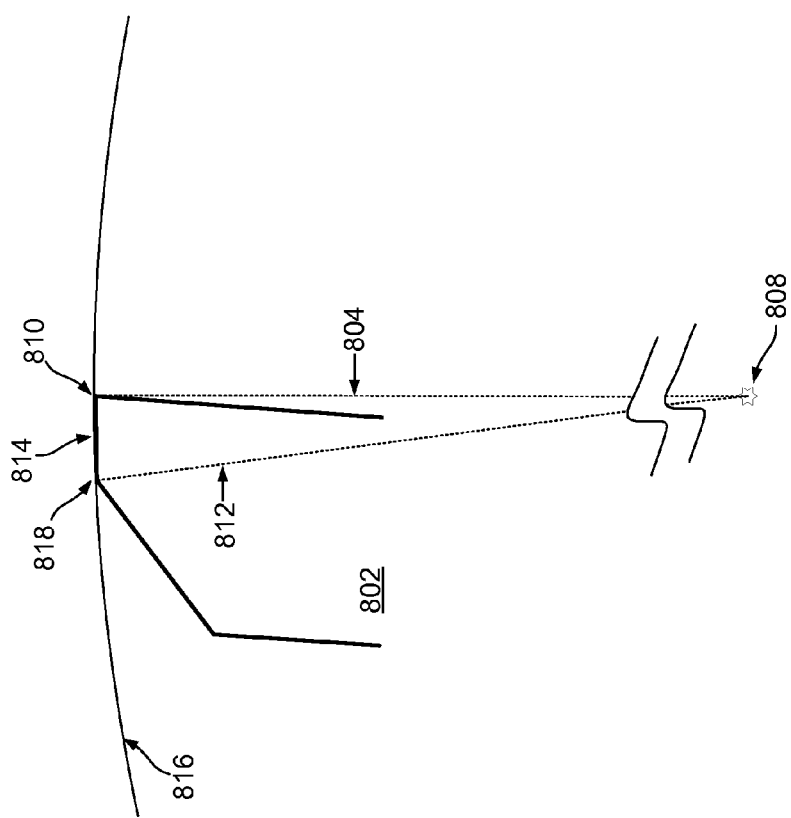
FIG. 8A
FIG. 8B

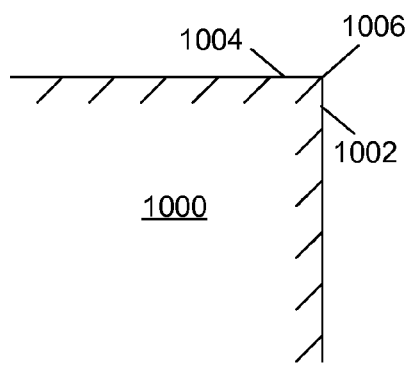
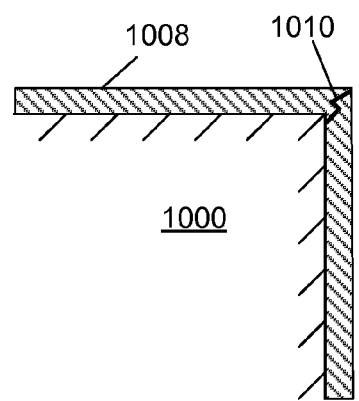
FIG. 10A     FIG. 10B
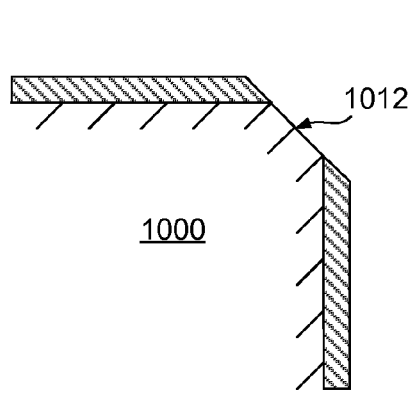
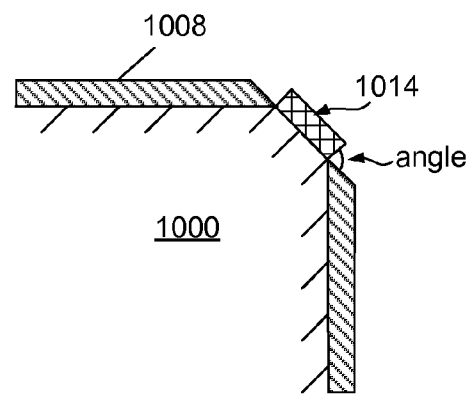
FIG. 10C     FIG. 10D

CUTTING TOOLS FOR CUTTING CURVED AND COMPLEX FEATURES

CROSS REFERENCE TO RELATED APPLICATIONS

This application is a continuation in part application and claims priority under 35 U.S.C. §120 to U.S. Non-provisional patent application Ser. No. 13/610,838, filed Sep. 11, 2012, entitled "DIAMOND CUTTING TOOLS," which claims priority under 35 U.S.C. §119(e) to U.S. Provisional Patent Application No. 61/689,170, filed May 29, 2012, entitled "COMPONENT FOR AN ELECTRONIC DEVICE," each of which is incorporated herein by reference in its entirety and for all purposes.

FIELD OF THE DESCRIBED EMBODIMENTS

The described embodiments relate generally to cutting and to surface finishing. More specifically, methods and tools for cutting a highly reflective and smooth surface on a finished product.

BACKGROUND

Many consumer products such as electronic devices have surfaces that are fabricated from metal. In many cases, these metal surfaces are shiny and reflective so as to enhance the look and feel of the products. In general, the smoother the metal surface, the more reflective it is. These metal surfaces are often polished to rub or chemically reduce the amount of irregular topography of the metal surface to leave a smoother profile, and thus a shinier surface.

In some cases, the metal surfaces can include sharp edges and features. Since standard polishing techniques typically reduce the overall topography of the metal surface, these standard polishing techniques can also erode the sharp edges leaving rounded or tapered features.

Therefore, providing a device and method for producing a highly reflective metal surface while keeping the integrity of the workpiece geometry, especially at sharp edges, is desired.

SUMMARY

This paper describes various embodiments that relate to cutting and finishing a surface using a cutter capable of cutting and burnishing a surface. Methods described are useful for cutting and providing a highly reflective and smooth surface to a part. The cutting methods can be used to cut metal or non-metal surfaces. The methods can be used to cut curved and complex features in a part.

According to one embodiment, a cutting tool assembly arranged to perform a cutting operation on a part is described. The tool holder is configured to rotate about an axis. The cutting tool assembly includes a first cutting tool attached to the tool holder at a first radial distance from the axis and comprising a first cutting edge, the first cutting edge having a straight cutting surface configured to cut a planar surface in the part. The cutting tool assembly also includes a second cutting tool attached to the tool holder at a second radial distance from the axis and comprising a second cutting edge having a curved cutting surface. The curved cutting surface is characterized as having a radius of curvature. The curved cutting surface is configured to cut a curved surface in the part adjacent to the planar surface.

According to another embodiment, a method of cutting a complex feature in a part using a cutting tool assembly is described. The cutting tool assembly has a tool holder, a first cutter and a second cutter. The method involves forming a planar surface in the part by cutting the part using the first cutter. The first cutter has a first cutting edge having a straight cutting surface. The method also involves forming a curved surface adjacent to the planar surface by cutting the part using the second cutter. The second cutter has a second cutting edge characterized as having a radius of curvature. During the cutting, the first and second cutters are rotated about an axis of the tool holder. The first cutting tool is attached to the tool holder at a first radial distance from the axis and the second cutting tool is attached to the tool holder at a second radial distance from the axis.

According to an additional embodiment, a method of adjusting the shape of a feature cut into a part is described. The method involves forming a first feature having a first shape by cutting a first surface in the part with a first cutter and an adjacent second surface in the part with a second cutter. The first cutter is attached to a cutting machine at a first radial distance from a central axis of rotation. The second cutter is attached to the cutting machine at a second radial distance from the central axis of rotation. The method additionally involves adjusting a swing diameter of the second cutter by changing the second radial distance. The method further involves forming a second feature having a second shape by cutting a third surface in the part with the first cutter and an adjacent fourth surface in the part with the second cutter.

BRIEF DESCRIPTION OF THE DRAWINGS

FIGS. 2A and 2B illustrate additional configurations of diamond cutting tool assemblies in accordance with described embodiments.

FIGS. 8A and 8B illustrate diamond cutters undergoing two different alignment procedures in accordance with described embodiments.

FIGS. 10A-10D graphically illustrate selected profiles of a part undergoing a cutting process described in the flowchart of FIG. 9.

DETAILED DESCRIPTION OF SELECTED EMBODIMENTS

Figure 1:
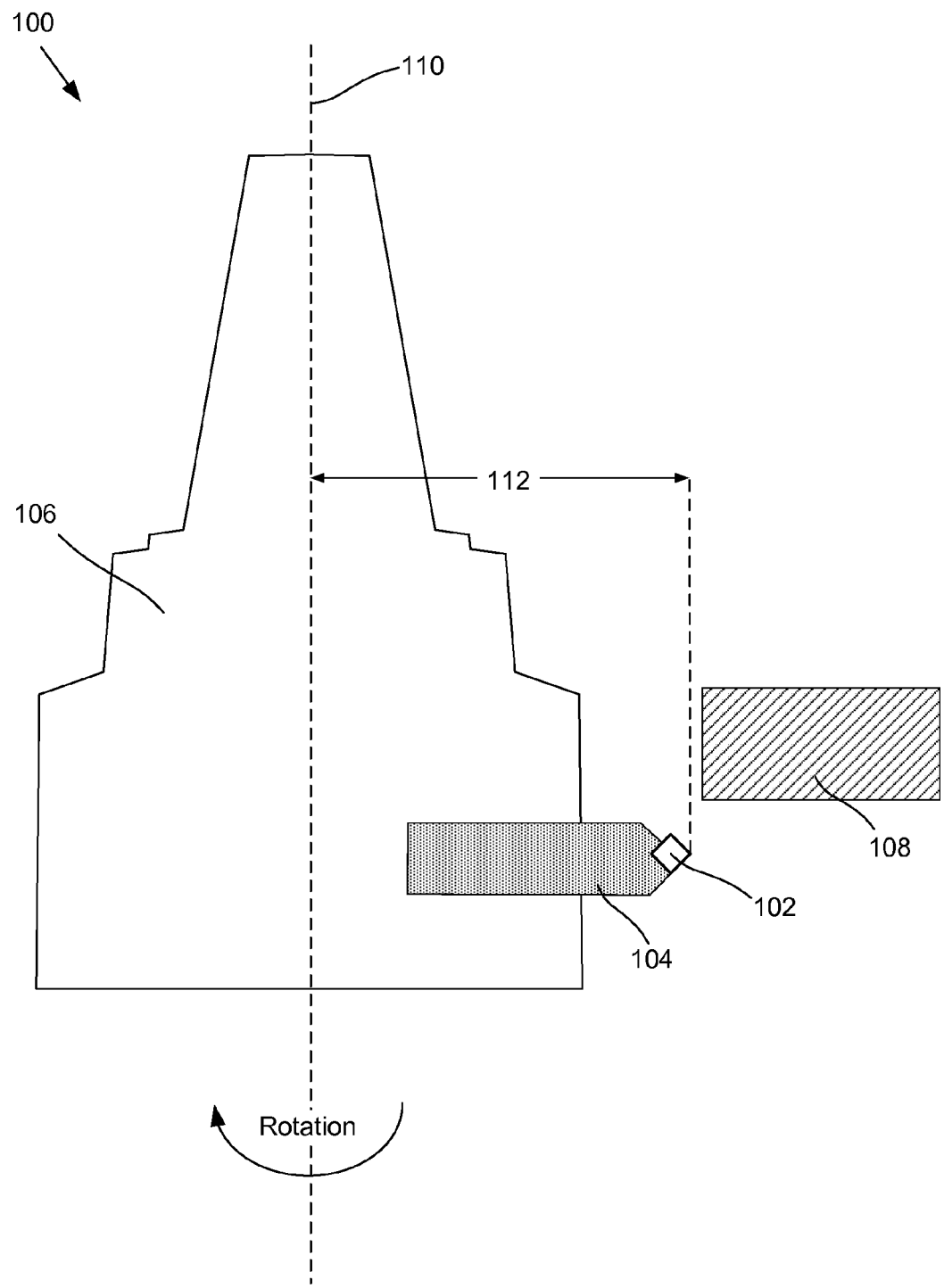
FIG. 1 illustrates a diamond cutting tool assembly in accordance with described embodiments.

The following disclosure describes various embodiments of electronic devices, such as portable electronic devices including, for example, mobile telephones. Certain details are set forth in the following description and Figures to provide a thorough understanding of various embodiments of the present technology. Moreover, various features, structures, and/or characteristics of the present technology can be combined in other suitable structures and environments. In other instances, well-known structures, materials, operations, and/or systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In the detailed description, reference is made to cutting a workpiece or part. In certain embodiments, the part can be made of metal, such as aluminum or aluminum alloy. However, a person of skill in the art would recognize that in the context of the present technology, the term part can refer to any suitable material capable of undergoing a cutting procedure to form a highly reflective surface, including metal, plastic, glass, and so forth.

The embodiments described herein relate to methods, systems, and structures for forming a highly reflective surface cut into a part. In the described embodiments, a diamond cutter is used to cut a surface of the part. The diamond cutter can be a poly crystalline diamond (PCD) or a mono crystalline diamond (MCD). In described embodiments, the diamond cutter has a cutting edge, a land and a heel. The cutting edge removes surface material from the surface of the part to form a second scalloped surface having peaks and troughs, the peaks reducing the overall reflective or smooth appearance of the second surface. The land, and optionally heel, subsequently burnishes the second surface by reducing the peaks to form a highly reflective and smooth finished surface. Thus, the diamond cutter simultaneously cuts and burnishes portions of the part, eliminated the need for an additional polishing step. In preferred embodiments, the diamond cutter is configured to have a relatively long cutting radius, which results in the smoother highly reflective finished surface.

In described embodiments, a diamond cutter is mounted in a machining tool, such as a computerized numerical control (CNC) machining tool, for cutting a part. In certain embodiments a diamond cutter is configured to be used in a milling machine, wherein the diamond cutter is rotated in a circular motion around a spindle axis and moved along the workpiece surface to contour the surface of the workpiece. FIG. 1 shows a cutting tool assembly 100 in accordance with described embodiments. As shown, cutting tool assembly 100 includes tool holder 106 and a cutting tool, which includes diamond cutter 102 and shank 104. Diamond cutter 102 is coupled to shank 104 using, for example, a brazing procedure. Shank 104 is configured to removably fit into tool holder 106, which is in turn configured to be positioned in a milling machine (not shown). Cutting tool assembly 100 is positioned to cut workpiece 108, which can be secured using any of a number of suitable methods, such as by use of a clamp. During a cutting operation, cutting tool assembly 100 rotates about spindle axis 110 while secured workpiece 108 is moved toward diamond cutter 102. In alternative embodiments, cutting tool assembly can be moved toward secured workpiece 108. The cutting edge of diamond cutter 102 is positioned at a cutting radius 112 from the spindle axis 110. With each rotation of the spindle, diamond cutter 102 takes a cut at the surface of workpiece 108. During a milling cutting operation, the cutting edge of diamond cutter 102 enters and exits workpiece 108 a number of times, also known as interrupted cutting. This interrupted cutting can produce a scalloped surface on workpiece 108, which can diminish the overall reflective or smooth appearance of the cut surface. The cutting tool and methods described herein can reduce the amount of scalloped surface on workpiece 108, thereby forming a highly reflective and smooth finished surface on workpiece 108. Details regarding reducing a scalloped surface in accordance with embodiments will be described below.

FIGS. 2A and 2B illustrate additional configurations of cutting tool assemblies in accordance with described embodiments. At FIG. 2A, diamond cutter 202 is coupled to shank 204, which is in turn removably coupled to tool holder 206. Tool holder 206 is configured to be mounted in a milling tool (not shown). In this case, shank 204 is positioned in tool holder 206 such that the length of shank 204 is substantially parallel to the spindle axis of rotation 210. Workpiece 208 is positioned such that diamond cutter 202 can cut the surface if workpiece 208. At FIG. 2B, holder 212 is configured to hold two shanks 214 and 216, each of which have diamond cutters 218 and 220, respectively, disposed thereon. In this case, both shanks 214 and 216 are substantially perpendicular to spindle axis of rotation 226. Diamond cutter 218 is positioned to cut workpiece 222 and diamond cutter 220 is positioned to cut workpiece 224. In one embodiment, workpiece 222 and 224 are the same workpiece and diamond cutters 218 and 220 cut workpiece 222/224 at different times. For example, diamond cutter 218 can cut a first portion of workpiece 222/224. Next, workpiece 222/224 can be re-positioned in front of diamond cutter 220 and diamond cutter 200 can cut a second portion of workpiece 222/224.

Figure 3:
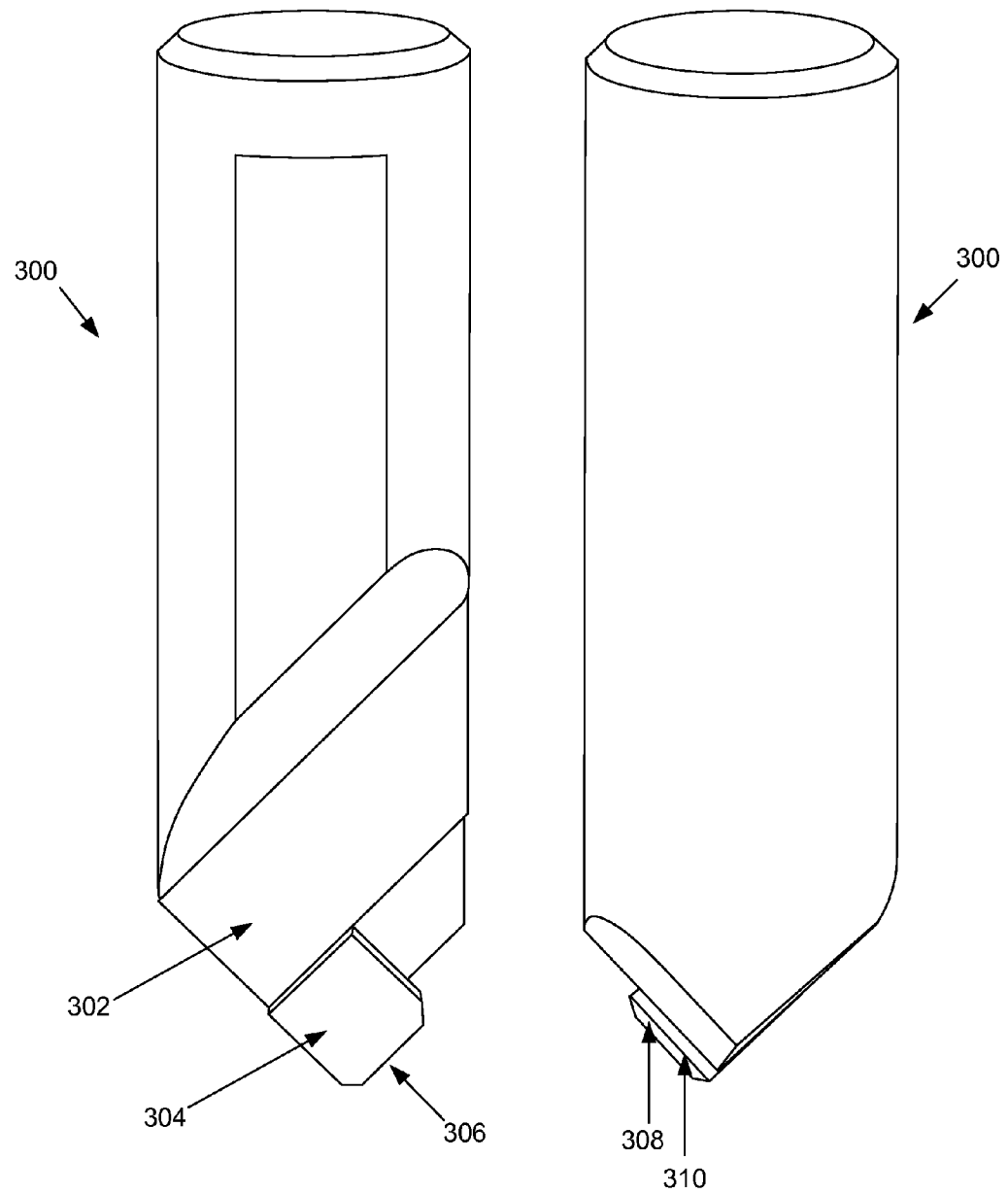
FIG. 3 illustrates two perspective side views of a diamond cutting tool in accordance with described embodiments.

FIG. 3 illustrates two perspective side views of a diamond cutting tool 300 in accordance with some embodiments of the disclosure. Cutting tool 300 includes shank 302 and diamond cutter 304. Diamond cutter 304 is mechanically coupled to shank 302 using, for example, a brazing procedure. The brazing procedure typically uses an alloy filler metal, such as silver containing filler alloy. As shown, diamond cutter 304 is positioned on the end of cutting tool 300 such that cutting edge 306, land 308 and optionally heel 310 can contact the workpiece during cutting. Shank 302 is preferably made from a rigid material, such as carbide, to rigidly maintain the position of cutting tool 300 during cutting, thereby allowing a smoother finished cut to be made. The shape of shank 302 can vary to maximize rigidity during the cutting procedure. The length of shank 302 can in part determine the cutting radius during cutting of a workpiece. Shank 302 can be configured to be mechanically coupled to a tool holder (not shown) which is attached to a spindle of a milling machine (not shown), which spins cutting tool 300 at high speeds. In certain embodiments, cutting tool 300 is positioned in a tool holder (not shown) such that the cutting radius is relatively large. By using a relatively large cutting radius, cuts made by cutting tool 300 can have relatively less scalloped portions, which will be discussed in detail below with reference to FIGS. 7A-7D. As cutting tool 300 is held rigidly in place by shank 302 within a tool holder (not shown), the cutting angle relative to the workpiece can stay steady.

Figure 4B:
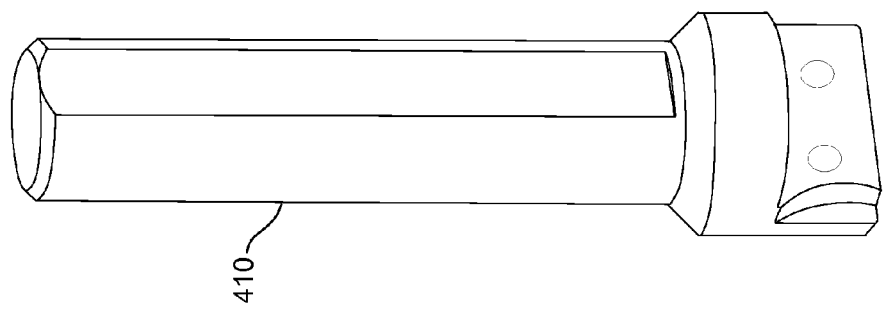
FIGS. 4A and 4B illustrate perspective side views of an insert and shank portions of a diamond cutting tool in accordance with described embodiments.
Figure 4A:
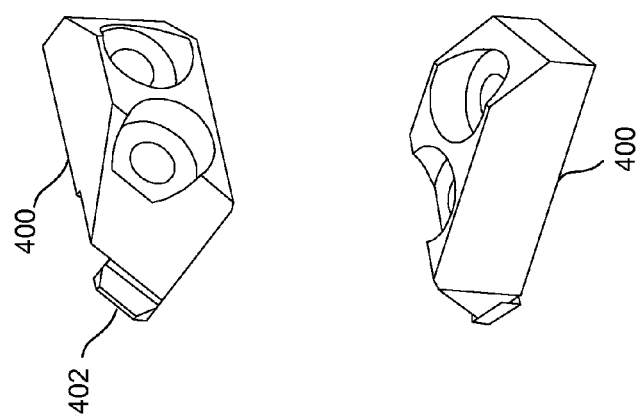

FIGS. 4A and 4B illustrate alternative embodiments of a cutting tool in accordance with the present technology. FIG. 4A shows two perspective views of an insert piece 400. Diamond cutter 402 is mechanically coupled to insert piece 400 at on end using, for example, a brazing procedure. The brazing procedure can use an alloy filler metal, such as silver containing filler alloy. Diamond cutter 402 is positioned on the end of insert piece 400 such that the heel, land and optionally heel can contact the workpiece during cutting. FIG. 4B shows shank 410 which can be connected to insert piece 400 using, for example, bolts to form the finished cutting tool. The cutting tool can then be inserted in the machining tool similarly to cutting tool 300 of FIG. 3.

As described above, embodiments of the disclosure involve the use of a diamond cutter which can be made of a polycrystalline diamond (PCD) or a mono crystalline diamond (MCD). In general, diamond is arranged in a cubic crystalline lattice system, in which carbon atoms are covalently bonded. The extremely high bond and lattice energy of diamond makes it extremely hard therefore a better cutting material than metals or carbides, for example. Two forms of diamond are polycrystalline diamond (PCD) and monocrystalline diamond (MCD). PCD is made up of many small individual crystals bound together with a binder material, such as a cobalt binder. Cutting tools made of PCD can have a somewhat serrated edge due to the boundaries where the individual crystals are bound together. PCD cutting tools are often described by the average size of the crystals, also called grain size, and type of binder. When a PCD is used to cut a surface, marks from the cutting edge can appear on the surface which correspond to the grain boundaries between the crystals. These marks typically appear as lines on the workpiece surface. In contrast MCD is one continuous crystal which does not have grain boundaries. Since MCD does not have grain boundaries, it does not leave grain boundary marks from the cutting edge as in the case with PCD. It should be noted, however, that in a milling operation, both PCD and MCD cutters can leave marks due to an interrupted cut during the milling process. As described above, an interrupted cut is due to the cutter contacting the workpiece surface at each rotation of the spindle. The interrupted cutting can leave a scalloped surface on the workpiece.

Figure 5:
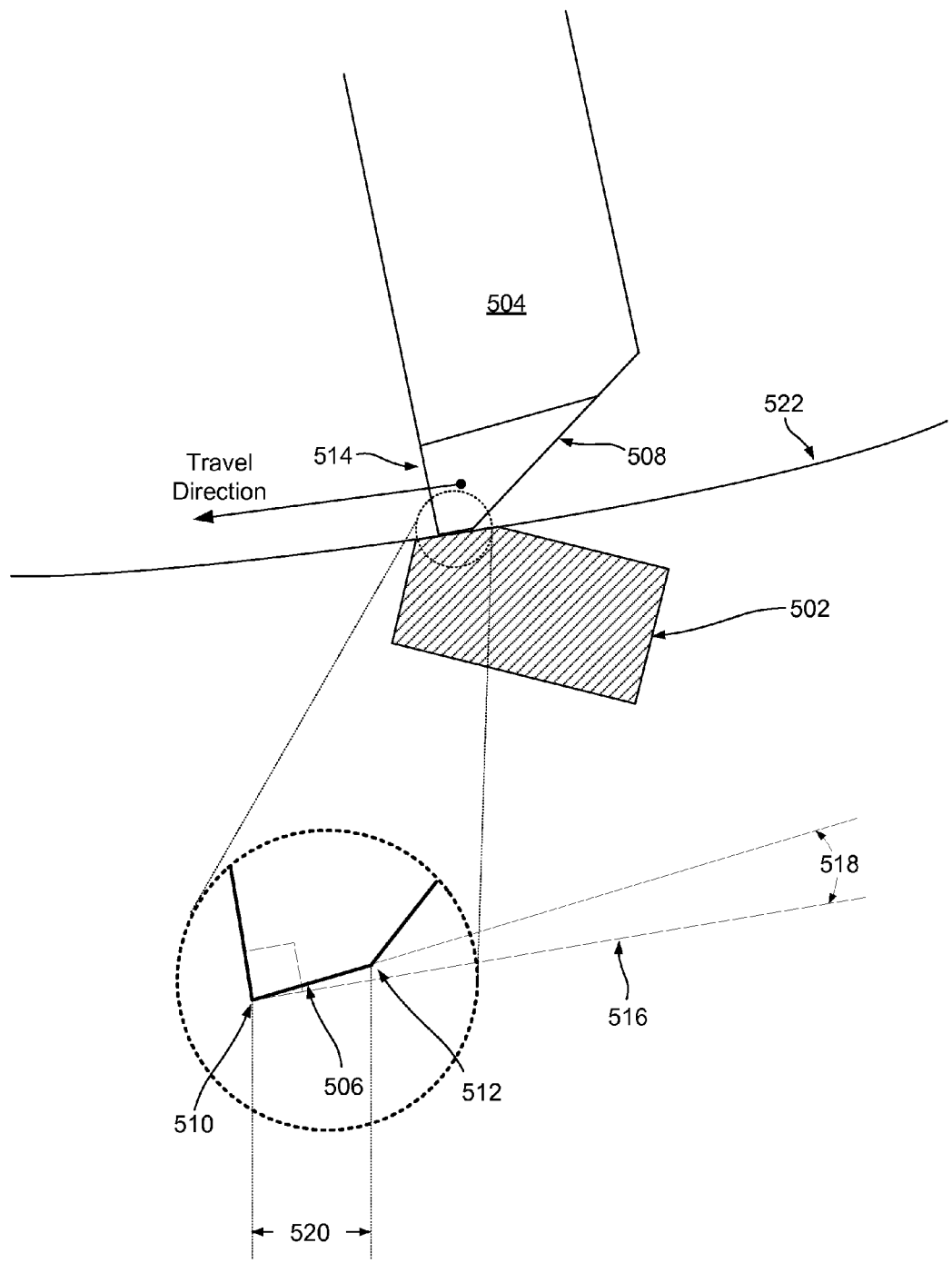
FIG. 5 illustrates a diamond cutter during a cutting procedure in accordance with described embodiments.

In order to lessen the scalloped portions of a cut surface and to produce a highly reflective and smooth finished surface, embodiments of the present disclosure include a diamond cutter having features graphically illustrated in FIG. 5. The top view and close up inset views illustrated in FIG. 5 show diamond cutter 504 cutting workpiece 102. Diamond cutter 504 includes three surfaces: rake face 514; land or primary clearance 506; and secondary clearance 508. Diamond cutter 504 is mechanically coupled to a shank (not shown), which is in turn mechanically coupled to a toll holder (not shown), which is in turn mechanically coupled to a milling machine (not shown). Cutting edge 510 of diamond cutter 504 rotates around the spindle axis of the milling machine at a cutting arc 522. Cutting arc 522 is a function of the cutting radius (e.g., 112 of FIG. 1) from the cutting edge 510 to the spindle axis (e.g., 110 of FIG. 1). Diamond cutter 504 can contact workpiece 502 at cutting edge 510, land 506 and heel 512. Since cutting edge 510, land 506 and heel 512 can come into contact with workpiece 502 during cutting, it is advantageous for these surface to be substantially free of defects caused, for example, by a lapping or polishing procedure in the manufacturing process of the diamond cutter. In preferred embodiments, cutting edge 510, land 506 and heel 512 have minimal visual imperfections such as lapping or polishing chips. In one embodiment for a MCD cutter, the cutting edge, land and heel have no visible imperfections at 500× magnification. In one embodiment for a PCD cutter, the cutting edge, land and heel have no visible imperfections at 100× magnification. It should be understood that lower or higher quality diamond cutters with greater or fewer imperfections can be used. Factors such as cost, availability and type of diamond cutters can be considered when determining the quality of diamond cutter used in a particular application. For example, an MCD cutter with a high quality cutting edge (e.g., very few visible imperfections) can be used in applications where the resultant cut surface is at a highly visible portion of an electronic device. A PCD cutter can be used, for example, in applications where the resultant cut surface can be slightly obscured by, for example, a dark anodizing film.

Before a cutting operation begins, diamond cutter 504 can be aligned such that the cutting edge 510 contacts workpiece 502 and effective primary clearance angle 518 puts land 506, and optionally heel 512, into contact with workpiece 502. Example alignment procedures will be discussed in detail below with reference to FIGS. 8A and 8B. During cutting, diamond cutter 104 proceeds in the travel direction as show in FIG. 5. First, cutting edge 510 cuts the surface of workpiece 502 resulting in a second surface with peaks and troughs. Next, land 506, and optionally heel 512, can come into contact with workpiece 502 burnishing the surface and removing substantially all the peaks of the second surface, thereby providing a highly reflective and smooth finished surface on workpiece 502. The degree in which the peaks are removed depends on the amount of burnishing the land and heel impart on the surface. Details regarding removal of peaked portions of a scalloped surface in accordance with embodiments will be described below with reference to FIGS. 6A and 6B. Since the surface is highly reflective and smooth, there is no need for a subsequent traditional polishing process. In this way an entire polishing step can be removed from the manufacturing process. Note that in some embodiments, the effective primary clearance can be backed off the surface of workpiece 502 a small amount before cutting begins. In this backed off configuration, portions of land 506 can still come into contact and burnish workpiece 502 due to elastic recovery of workpiece 502 material during the cutting process. Using the cutter in this backed off configuration can extend the lifetime of diamond cutter 504.

Figure 6A:
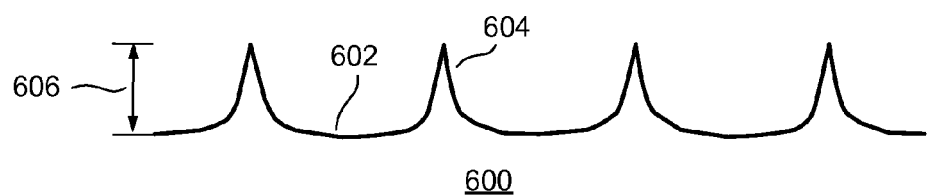
FIGS. 6A and 6B illustrate a selected profile of a part undergoing a cutting procedure in accordance with described embodiments.
Figure 6B:
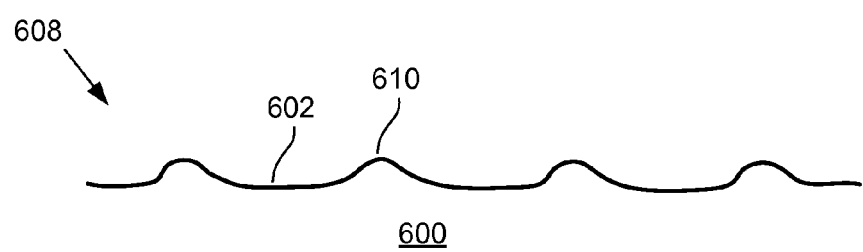

As discussed above, after a cutting edge of a diamond cutter cuts the surface of a workpiece, a scalloped surface can remain on the workpiece. To illustrate this graphically, reference will now be made to FIGS. 6A and 6B, which show cross sections of a surface of a workpiece undergoing a cutting procedure in accordance with described embodiments. In FIG. 6A, workpiece 600 has undergone cutting from only the cutting edge (510 in FIG. 5), leaving a second surface with peaks 604 and troughs 602. Peaks 604 can be caused by interrupted cutting due to the milling process as described above. In FIG. 6A, peaks 604 protrude a height 606 from trough 602. In FIG. 6B, workpiece 600 has been contacted by the land, and optionally heel, (506 and 512, respectively, in FIG. 5) reducing substantially all the height 606 of peaks 604, leaving a highly reflective finished surface 608. It is noted that there still can be remaining slightly protruding portions 610 on highly reflective and smooth finished surface 608, depending on the amount of burnishing (i.e. amount of rubbing), however surface 608 is generally highly reflective and smoothed to a mirror shine and generally does not require further polishing.

Figure 7A:
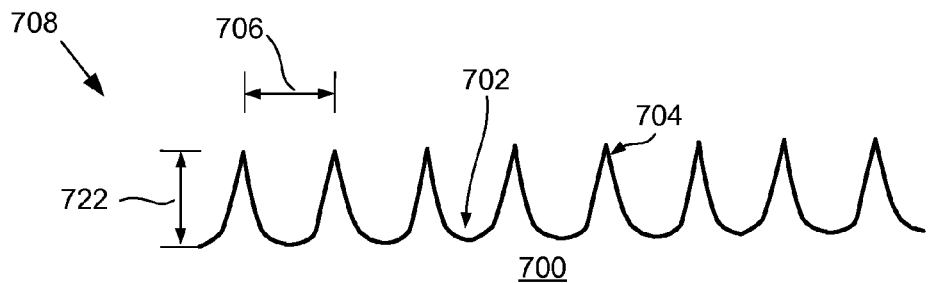
FIGS. 7A-7D illustrate selected profiles of two separate parts undergoing cutting procedures using two different diamond cutting tools in accordance with described embodiments.
Figure 7B:
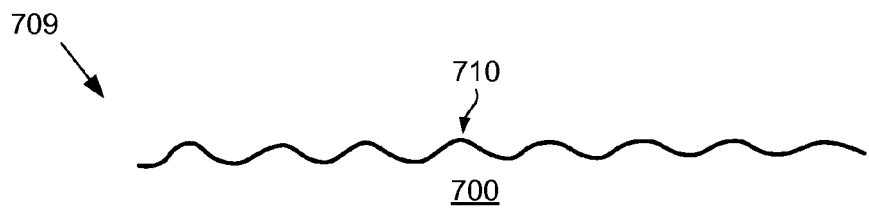

In order to obtain as smooth as possible highly reflective and smooth finished surface, in some embodiments the cutting radius (112 of FIG. 1) is relatively long. To illustrate graphically how the cutting radius effects the overall smoothness of the resulting surface, reference will now be made to FIGS. 7A-7D which show side views of two different workpieces undergoing cutting from two different diamond cutters in accordance with the described embodiments. FIGS. 7A and 7B show workpiece 700 undergoing a cutting procedure using an diamond cutter with a short cutting radius, and FIGS. 7C and 7D show workpiece 712 undergoing a cutting procedure using an diamond cutter with a long cutting radius.

At FIG. 7A, workpiece 700 has undergone cutting from the cutting edge of a diamond cutter assembly having a short cutting radius. That is, the distance between the cutting edge and the spindle axis is relatively short. After only cutting edge cuts workpiece 700, a second scalloped surface 708 with peaks 704 and troughs 702 is formed. Peaks 704 can be caused by the interrupted cutting due to milling process. The distance 706 between the peaks 704 is directly proportional to the cutting radius of the diamond cutting assembly. At FIG. 7B, workpiece 700 has been contacted by the land, and optionally the heel, reducing substantially all the height 722 of peaks 704, leaving a highly reflective and smooth finished surface 709 with remaining slightly protruding portions 710 which diminish the overall reflective and smooth appearance of a highly reflective and smooth finished surface 709.

Figure 7C:
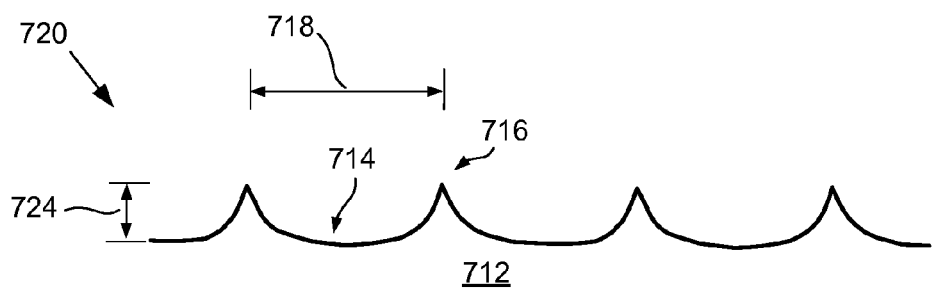
Figure 7D:
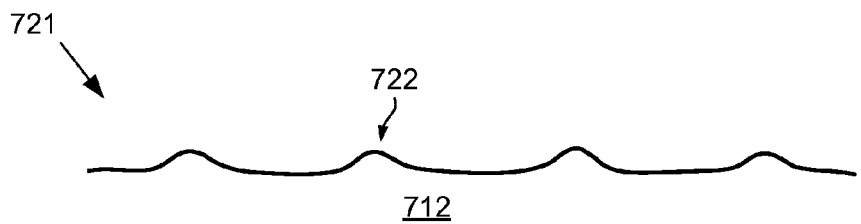

At FIG. 7C, workpiece 712 has undergone cutting from the cutting edge of a diamond cutter assembly having a short cutting radius. That is, the distance between the cutting edge and the spindle axis is relatively long. After only cutting edge cuts workpiece 712, a second scalloped surface 720 with peaks 716 and troughs 714 is formed. Since the distance 718 between the peaks 716 is directly proportional to the cutting radius of the diamond cutting assembly, distance 718 is longer than distance 706 of workpiece 700 at FIG. 7A. Thus, second surface 720 has a smaller portion having peak 716 compared to the second surface 708 of FIG. 7A. At FIG. 7D, workpiece 712 has been contacted by the land, and optionally the heel, reducing substantially all the height 724 of peaks 716, leaving a highly reflective and smooth finished surface 720 with remaining slightly protruding portions 722. Note that there are less remaining slightly protruding portions 722 in the highly reflective and smooth surface 720 compared to remaining slightly protruding portions 712 in the highly reflective and smooth surface 721. Therefore, using a diamond cutter assembly having a longer cutting radius can provide an improved overall highly reflective and smooth finished surface. In one embodiment the diamond cutter assembly has a cutting radius about 35 millimeters.

Since the cutting procedures described in the present technology requires a high level of accuracy regarding the surface geometry of the workpiece, the cutting tool should be aligned at a high level of accuracy relative to the workpiece surface before the cutting process begins. It can be difficult to manufacture diamond cutter to meet extremely high levels of specified dimensional and defect free specifications. Therefore, embodiments of the disclosure involve calibration procedures to compensate for any imperfections in the geometric dimensions of the diamond cutter. In one embodiment, calibration involves calibrating the cutter directly on the workpiece surface wherein the cutter is rotated until the cutting edge, land and heel (510, 506 and 512, respectively, in FIG. 5) contact the workpiece surface. In other embodiments, calibration involves rotating the cutter tool until the land (506 in FIG. 5) provides sufficient burnishing to the workpiece surface.

FIGS. 8A and 8B illustrate two different alignment or calibration procedures to optimize the amount and effectiveness of burnishing in accordance with described embodiments. In both FIGS. 8A and 8B, the diamond cutter is initially positioned in the milling machine for cutting. At FIG. 8A, diamond cutter 802 is calibrated by controlling the difference in length between first line 804 from spindle axis 808 to cutting edge 810, and a second line 812 from spindle axis 808 to heel 818. The length of first line 804 (R1) is measured and the length of second line 812 (R2) is measured. Measurement can be accomplished by using, for example, laser generated reference lines (shown by dotted lines). Next, a cutting operation is performed on a workpiece (not shown) using the R1 and R2 parameters. After the cutting operation is complete, the workpiece is inspected to determine the quality of cut, i.e., the reflectiveness and smoothness of the resulting cut surface. Next, the position of diamond cutter 802 is moved such that R1 is longer or shorter, i.e., land 814 and heel 818 are farther or closer to cutting arc 816. The bigger R2 is compared to R1, the more land 814 and heel 818 will rub the workpiece and the more burnishing the workpiece will experience. In this way, controlling the difference between R1 and R2 can control the amount of burnishing. In preferred embodiments, the difference between R1 and R2 are optimized to allow land 814 and/or heel 818 to sufficiently burnish the surface of the workpiece, but not rub so hard as to provide too much friction during cutting. Next, another cutting operation is performed and the workpiece is again inspected for quality of cut. If the quality of cut is not of an acceptable quality, the re-positioning of the diamond cutter 802, cutting and inspecting is repeated until an acceptable quality cut is achieved.

At FIG. 8B, diamond cutter 820 is positioned within the tool holder (not shown) by controlling the angle between reference line 822 from cutting edge 824 to spindle axis 832 and the land 826. Reference line 822 can be generated by using, for example, a laser generated line (shown by dotted line). Next, a cutting operation is performed on a workpiece (not shown) using a theta angle 834 parameter. After the cutting operation is complete, the workpiece is inspected to determine the quality of cut, i.e., the reflectiveness and smoothness of the resulting cut surface. Next, the position of diamond cutter 820 is moved such that theta 834 is larger or smaller, i.e., land 826 and heel 828 are farther or closer to cutting arc 830. The farther outside land 826 and heel 828 are to arc 830, the more land 826 and heel 828 will rub the workpiece and the more burnishing the workpiece will experience. In this way, controlling the angle theta can control the amount of burnishing. As with the alignment procedure shown in FIG. 8A, theta angle parameter 834 can be optimized to allow land 826 and heel 828 to sufficiently burnish the surface of the workpiece, but not rub so hard as to provide too much friction during cutting. As with the alignment procedure described for FIG. 8A above, the cutting, re-positioning and inspection can be repeated until an acceptable quality of cut is achieved.

During the alignment procedures shown in FIGS. 8A and 8B, in some embodiments the amount of burnishing can be backed off the cutting radius a small amount before cutting begins. As discussed above with reference to FIG. 5, use of the diamond cutter in a backed off configuration can extend the lifetime of diamond cutter. In this backed off configuration prior to cutting, the heel does not touch the workpiece. However, during cutting the land can still come into contact with and burnish the surface of the workpiece due to elastic recovery of the workpiece material. Factors such as diamond cutter lifetime, desired amount of burnishing and amount of diamond cutter friction on the workpiece can be considered when optimizing the alignment of the cutting tool.

Figure 9:
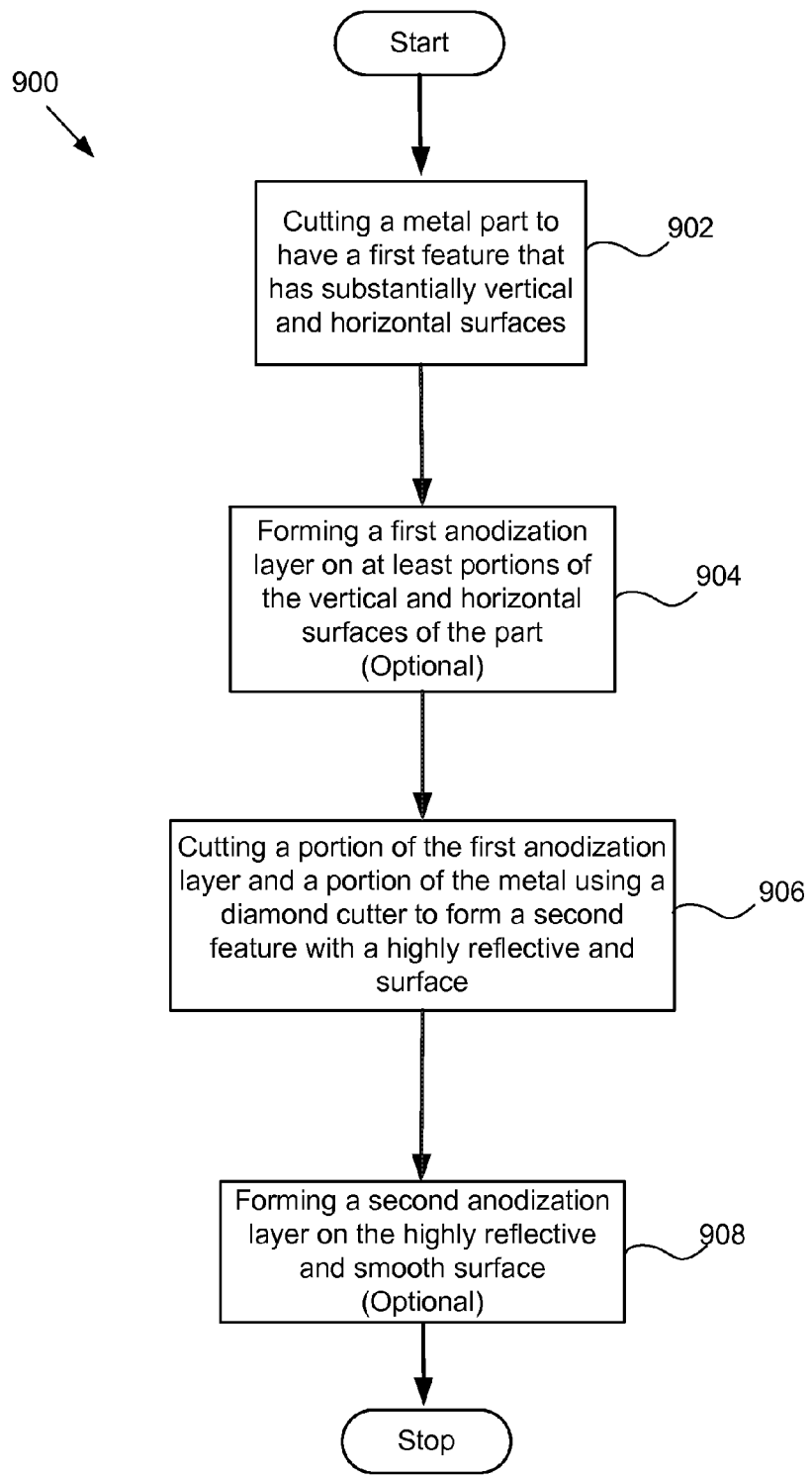
FIG. 9 is a flowchart illustrating a process which includes a cutting process graphically presented in FIGS. 10A-10D.

In described embodiments, the part can be cut at a substantially flat surface portion of the part wherein the substantially flat surface is given a highly reflective and smooth finish. Alternatively, the part can be cut at a portion of the part that has a feature with horizontal, vertical and angled surfaces. The diamond cutter can cut the feature to form a different feature that has a highly reflective and smooth finished surface. For instance, a chamfer may be cut at a corner or edge of a workpiece. The resulting chamfer will have a highly reflective and smooth finished surface in accordance with the described embodiments. In order to protect the highly reflective and smooth surface, an optional transparent coating or plating can be formed thereon. In certain embodiments, the transparent coating is an anodization layer that is substantially clear, thereby allowing the highly reflective surface to be visible through the anodization layer. FIGS. 9 and 10A-10D illustrate steps involved in a process of forming a feature with a highly reflective and smooth surface into a part in accordance with embodiments of the technology. FIG. 9 is a flowchart detailing process steps and FIGS. 10A-10D graphically present side views of a portion of a metal part undergoing the process described in FIG. 9. In the following narrative, reference will be made to the flowchart of FIG. 9 in conjunction with the side view presentations of FIGS. 10A-10D.

Process 900 begins at 902 (corresponding to FIG. 10A) where part 1000 is cut to have a first surface with vertical 1002 and horizontal 1004 portions. In FIG. 10A, the first surface has an edge 1006. Part 1000 can be cut using any number of suitable cutting procedures such as a machining procedure to form the shape of part 1000. It should be noted that substantially vertical 1002 and a horizontal 1004 portions in FIG. 10A-10D can form a edge 1006 having any angle, including a 90 degree angle. In addition, vertical 1002 and a horizontal 1004 portions can be substantially flat or they may be curved.

The part can then undergo optional surface treatments such as polishing and/or addition of artwork (e.g., company logo and/or text) using, for example, a photolithography process. In one embodiment, a blasting operation can be performed whereby the part is exposed to blasting media to create a rough blasted surface over the part.

At 904 (corresponding to FIG. 10B), part 1000 undergoes an optional first anodization process to form a first anodization layer 1008 that covers at least portions of vertical 1002 and horizontal 1004 surfaces of part 1000 near edge 1006. Anodization layer 1008 serves to protect the metal surface of part 1000 from corrosion and scratching. In one embodiment, first anodization layer 1008 is approximately 8 to 12 microns thick and is substantially opaque so that the underlying metal of part 1000 is not substantially visible through first anodization layer 1008. Note that due to stress build up at edge 1006, first anodization layer 1008 can have cracks 1010.

At 906 (corresponding to FIG. 10C), a portion of the optional first anodization layer 1008 and a portion of metal part 1000 is cut using an diamond cutter described above to form a second surface 1012 which is highly reflective and smooth surface. In certain embodiments, a portion of the optional first anodization layer 1008 and a portion of metal part 1000 are given a rough cut using a different cutting tool prior to using a diamond cutter tool. The rough cut can be made so as to remove a bulk amount of material before diamond cutter is used in accordance with described embodiments. The rough cut can be made using a suitable cutting tool such as a carbide or a metal cutter or a diamond cutter of lesser quality than the diamond cutter used to cut a highly reflective and smooth surface as described above. In FIG. 10C, the second surface is a chamfer. It should be noted that second surface 1012 can be cut at any angle relative to the horizontal 1004 and vertical 1002 portions. For example, second surface 1012 can be cut at a 45 degree angle relative to one of horizontal 1004 and vertical 1002 portions. Since second surface 1012 has a highly reflective and smooth surface, there is no need for subsequent polishing. This is advantageous, not only because it removes an extra step in the process, but also because traditional polishing techniques such as mechanical and chemical polishing, can erode features of the part. In particular, traditional polishing techniques can erode and round off sharp edges and corners such as the edges of chamfer 1012, reducing the aesthetic appeal of the part.

At 908 (corresponding to FIG. 10D), part 1000 undergoes an optional second anodization process to form a second anodization layer 1014 substantially only on and to protect the highly reflective and smooth chamfer 1014. It should be noted that the second anodization process can use different process parameters than the first anodization process described previously, forming second anodization layer 1014 with different physical characteristics than first anodization layer 1008. For example, second anodization layer 1014 can be substantially transparent in order to allow the underlying highly reflective and smooth chamfer 1015 to be viewable. In addition, the second anodization layer 1014 can be formed such that there is a clearly defined interface between first anodization layer 1008 and second anodization layer 1014 (shown by an angle in FIG. 10D). After process 900 is complete, the finished part in FIG. 10D has a highly reflective and smooth chamfer 1012 with sharply defined and cosmetically appealing edges.

Figure 11:
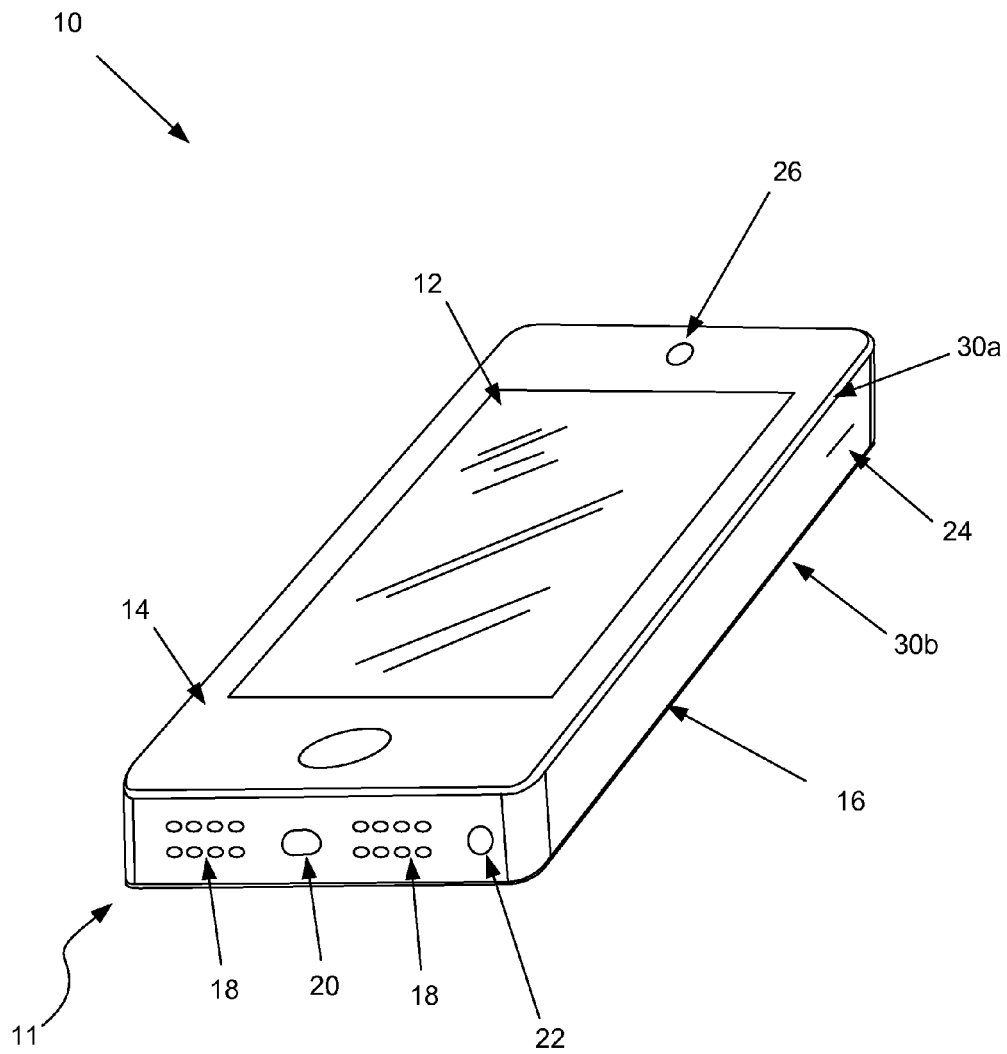
FIG. 11 is a schematic isometric view of a portable electronic device configured in accordance with an embodiment of the disclosure.

As discussed previously, tools and methods of the described embodiments can be applied in the fabrication of electronic devices, including for example, personal computers portable tablets and phones. FIG. 11 is a schematic isometric view of a portable electronic device 10 ("electronic device 10"), such as a mobile telephone, configured in accordance with an embodiment of the disclosure. In the illustrated embodiment, the electronic device 10 includes a body 11 carrying a display 12 that allows a user to interact with or control the electronic device 10. For example, the display 12 includes a cover or cover glass 14 that is operably coupled to a frame, housing, or enclosure 16. In certain embodiments, the display 12 and/or cover glass 14 can include touch sensitive features to receive input commands from a user. Moreover, in certain embodiments a cover or cover glass can be positioned on one side of the electronic device 10, or a cover or cover glass can be positioned on opposing sides of the electronic device 10. As described in detail below, the enclosure 16 and the cover glass 14 at least partially house or enclose several internal features of the electronic device.

In the embodiment illustrated in FIG. 11, the enclosure 16 also at least partially defines several additional features of the electronic device 10. More specifically, the enclosure 16 can include audible speaker outlets 18, a connector opening 20, an audio jack opening 22, a card opening 24 (e.g., SIM card opening), a front facing camera 24, a rear facing camera (not shown), a power button (not shown), and one or more volume buttons (not shown). Although FIG. 11 schematically illustrates several of these features, one of ordinary skill in the art will appreciate that the relative size and location of these features can vary.

In certain embodiments, the enclosure 16 can be made from a metallic material. For example, the enclosure 16 can be made from Aluminum, such as 6063 Aluminum. In other embodiments, however, the enclosure 16 can be made from other suitable metals or alloys. According to additional features of the embodiment shown in FIG. 11, the enclosure 16 includes opposing edge portions 30 (identified individually as a first edge portion 30a and a second edge portion 30b) extending around a periphery of the body 11. In certain embodiments, one or both of the edge portions 30 can have a chamfered or beveled profile. As described in detail below, the chamfered edge portions 30 can be processed relative to the enclosure 16 to provide an aesthetically appealing appearance. For example, the exterior surface of the enclosure 16 can be treated and the edge portions 30 can subsequently be treated. In one embodiment, for example, a first anodization process can be applied to the enclosure 16 and a second subsequent anodization process can be applied to the edge portions 30. Additional suitable surface treatments, including intermediary surface treatments, can be applied to the enclosure 16 and/or the edge portions 30. In still further embodiments, the edge portions 30 can have other suitable profiles or shapes including and/or surface treatments.

Figure 12:
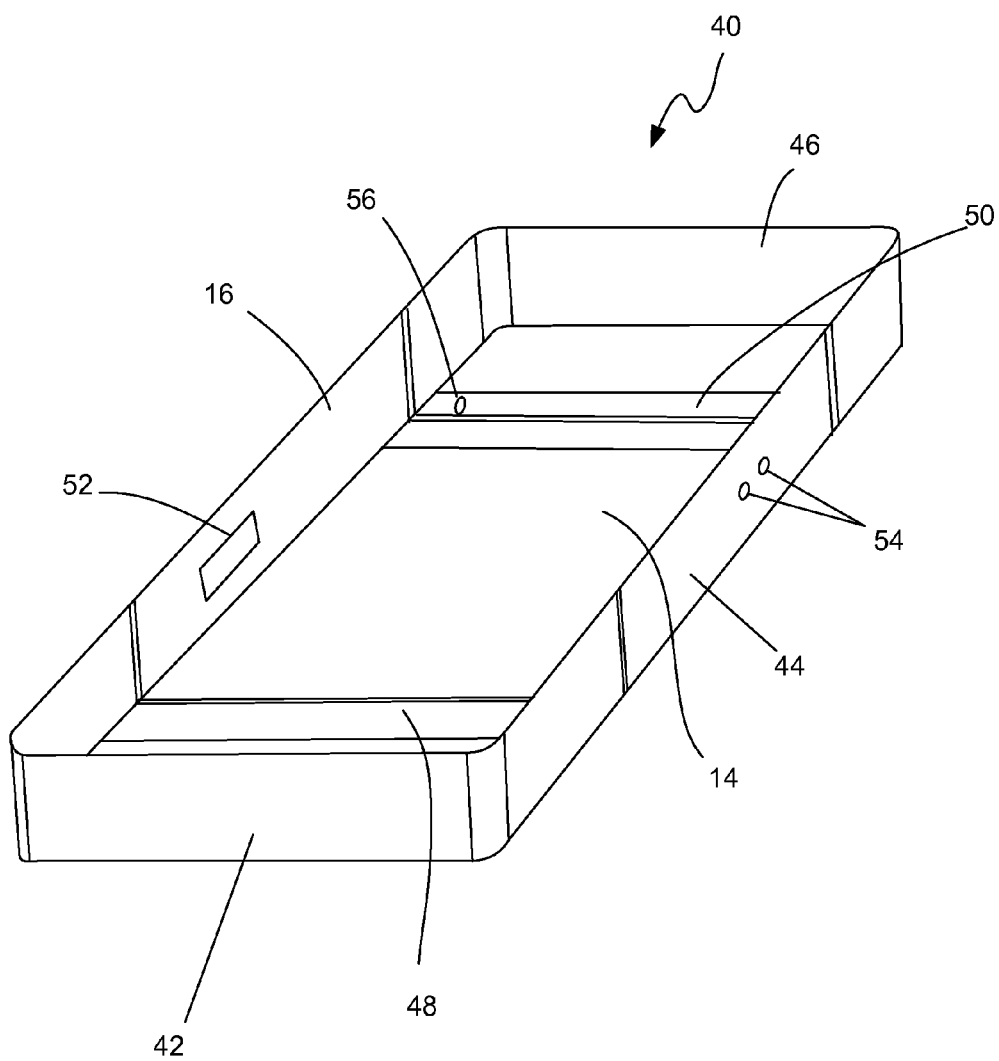
FIG. 12 is a schematic isometric view of at least a portion of a subassembly of the electronic device of FIG. 11.

FIG. 12 is a schematic isometric view of at least a portion of a subassembly 40 of the electronic device of FIG. 11. In the embodiment illustrated in FIG. 12, the subassembly 40 includes the enclosure 16 coupled to a cover glass, such as the cover glass 14 shown in FIG. 11. As shown in FIG. 12, the enclosure 16 includes a first enclosure portion 42 coupled to a second enclosure portion 44, which is in turn coupled to a third enclosure portion 46. More specifically, the enclosure 16 includes a first connector portion 48 that couples the first enclosure portion 42 to the second enclosure portion 44. The enclosure also includes a second connector portion 50 that couples the second enclosure portion 44 to the third enclosure portion 46. In certain embodiments, the first, second, and third enclosure portions 42, 44, and 46 can be metallic and the first and second connector portions 48, 50 can be made from one or more plastic materials. As described below in detail, for example, each of the first and second connector portions 48, 50 can be formed from a two shot plastic process that includes a first plastic portion that joins the corresponding enclosure portions and a second cosmetic plastic portion that at least partially covers the first plastic portions. As further described in detail below, these plastic portions can be configured to withstand harsh manufacturing processes and chemicals that may be used to form and process the enclosure. In further embodiments, the enclosure portions 42, 44, and 46 and/or the connecting portions 48, 50 can be made from other suitable materials including metallic, plastic, and other suitable materials.

According to additional features of the embodiment illustrated in FIG. 10, the enclosure 16 can include one or more low resistance conductive portions 52 (shown schematically) for grounding purposes. Conductive portions 52 can include, for example, of aluminum which can shield RF waves. The conductive portion 52 can be formed by removing one or more layers or portions of the enclosure 16 to provide a lower resistance through the enclosure 16 for antenna transmissions or communications. In certain embodiments, for example, the conductive portion 52 can be formed by laser etching or otherwise removing or etching an anodized portion of the enclosure 16.

The illustrated subassembly 40 also includes several inserts 54 that provide increased structural connection strength relative to the enclosure 16. In embodiments where the enclosure 16 is formed from Aluminum, for example, the inserts 54 can provide increased strength and durability. More specifically, in certain embodiments the inserts 54 can include titanium threaded inserts or nuts that are configured to threadably engage a corresponding fastener. Titanium inserts 54 can be advantageous in that the titanium material can withstand harsh manufacturing processes and chemicals. In other embodiments, however, the inserts 54 can be made from other suitable materials including, for example, steel, brass, etc.

According to yet additional features of the subassembly 40 shown in FIG. 12, and as described in detail below, the cover glass 14 can be securely coupled and/or offset (if desired) relative to the enclosure 16. More specifically, the cover glass 14 can be aligned with a reference plane or datum relative to the enclosure 16, and the enclosure 16 (and more specifically the first enclosure portion 42, the second enclosure portion 44, and/or the third enclosure portion 46) can include one or more access opening 56 to urge or bias the cover glass 14 relative to the enclosure 16 for secure attachment (e.g., adhesive attachment) while maintaining relatively tight tolerances between the coupled portions.

According to additional embodiments of the disclosure, and as described in detail below, the cover glass 14 can be made from a glass, ceramic, and/or glass-ceramic material. In one embodiment, for example, the cover glass 14 can be made from a glass with specific portions or volumes of the glass formed with ceramic properties. In other embodiments, however, the cover glass 14 can be formed from alumina silica based pigmented glass.

Figure 13:
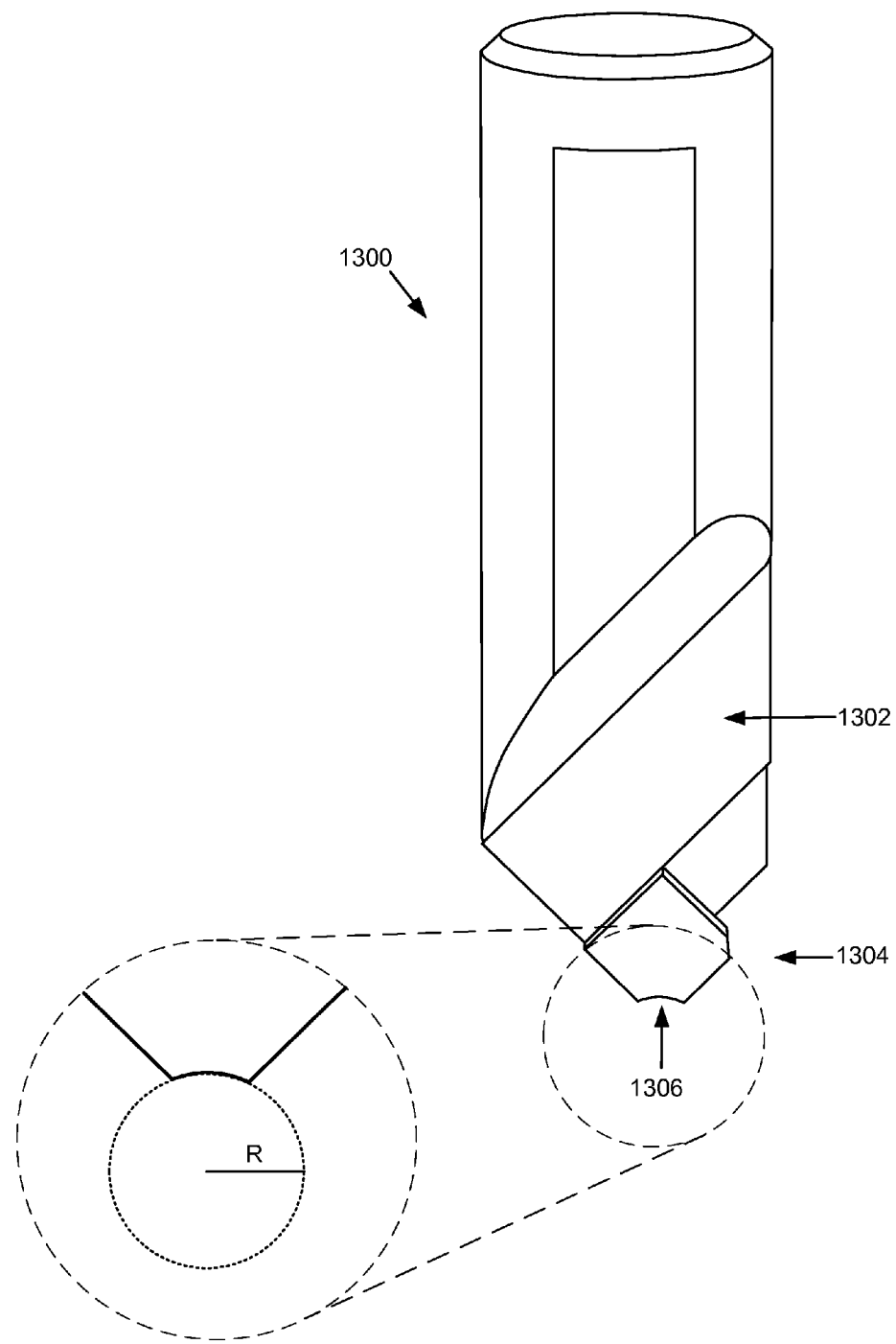
FIG. 13 illustrates a side view of a cutting tool with a curved diamond cutter in accordance with described embodiments.

In some embodiments, curved features can be formed in a part or workpiece. For example, a feature having curved edges or corners can be formed. FIG. 13 illustrates a side view of a cutting tool 1300 having a curved diamond cutter 1304. According to some embodiments, diamond cutter 1304 can be made of mono crystalline diamond (MCD). In alternative embodiments, diamond cutter 1304 can be made of polycrystalline diamond (PCD). Diamond cutter 1304 is positioned on shank 1302. Shank 1302 can be mechanically coupled to a tool holder (not shown), The tool holder can be attached to a spindle of a milling machine (not shown) which spins cutting tool 1300 at high speeds. During a cutting process, diamond cutter 1304 contacts and removes material from a part while being rotated in the milling machine. In one embodiment, diamond cutter 1304 is mechanically coupled to shank 1302 using a brazing procedure. The brazing procedure can use an alloy filler metal, such as silver containing filler alloy, to couple curved diamond cutter 1304 to shank 1302. Diamond cutter 1304 can be positioned on the end of cutting tool 300 such that curved cutting edge 1306 is positioned to contact the part during a cutting procedure. Shank 1302 is can be made from a rigid material, such as carbide, to rigidly maintain the position of cutting tool 1300 during cutting, thereby allowing a smoother finished cut to be made. Shank 1302 can have any of a variety of suitable shapes and sizes to maximize rigidity during a cutting procedure.

As shown in FIG. 13, diamond cutter 1304 has curved cutting edge 1306 having radius R. During a cutting procedure, cutting tool 1300 can be inserted into a tool holder, such as tool holder 106 of FIG. 1, and used to cut a part in a milling operation. During the cutting procedure, curved cutting edge 1306 can cut a surface of the part to form a correspondingly curved feature having radius R. For example, an edge of a part can be cut using curved cutting edge 1306 of cutting tool 1300 to form a curved edge having radius R. According to alternative embodiments, a cutting tool having a curved edge with a non-uniform radius or a spline-shaped curve can be used. The cutting tool having a spline-shaped curve can be used to form a corresponding spline-shaped feature on a part.

Figure 14A:
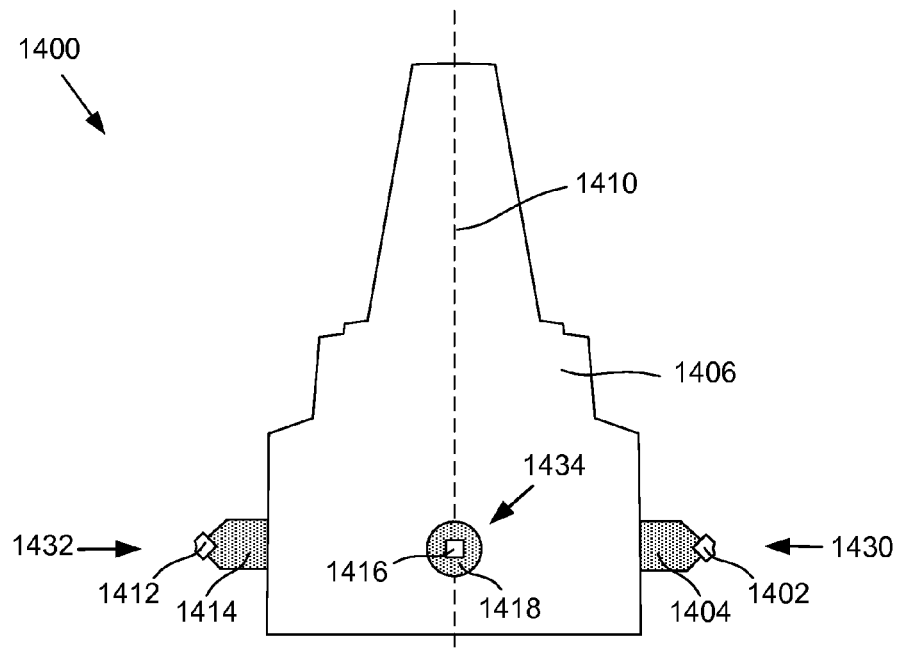
FIGS. 14A and 14B illustrate side and top views, respectively, of a diamond cutting tool assembly having three cutting tools in accordance with described embodiments.
Figure 14B:
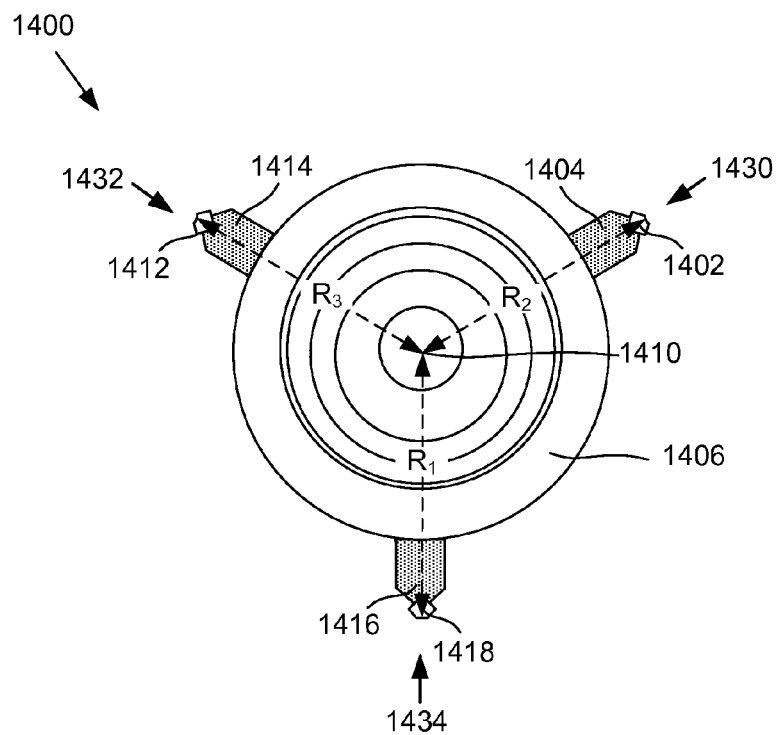

According to some embodiments, complex features can be formed on a part. For example, a feature having at least one curved portion and at least one straight portion can be formed. In one embodiment, a curved chamfered edge having a straight portion between two curved portions can be formed. In order to form complex features on a part, more than one cutting tool can be used. FIGS. 14A and 14B shows side and top views, respectively, of a cutting tool assembly 1400 having three cutting tools 1430, 1432 and 1434. In alternative embodiments, two cutting tools can be used. In other embodiments, four or more cutting tools can be used. As shown, cutting tool assembly 1400 includes tool holder 1406 which is configured to hold cutting tools 1430, 1432 and 1434. Cutting tools 1430, 1432 and 1434 each have diamond cutters 1402, 1412 and 1418 which are attached to shanks 1404, 1414 and 1416, respectively. During a cutting procedure, tool holder 1406 is positioned in a milling machine (not shown) where it can be rotated about axis 1410 during a milling procedure. During the cutting procedure, each of cutting tools 1430, 1432 and 1434 is rotated about axis 1410 while contacting and cutting a part (not shown). Cutting tool 1434 (and cutter 1418) can be adjusted to radial distance $R_1$ from axis 1410, cutting tool 1430 (and cutter 1402) can be adjusted to radial distance $R_2$ from axis 1410, and cutting tool 1432 (and cutter 1412) can be adjusted to radial distance $R_3$ from axis 1410. $R_1$, $R_2$ and $R_3$ can each be adjusted to adjust the swing diameter of each of cutting tools 1434, 1430 and 1432, respectively. In some embodiments, cutting tool assembly 1400 is also translated along a part, such as along the edge of a part, during the cutting procedure. Translation of cutting tool assembly 1400 along the part in one direction will elongate the cut surfaces. As shown in cutting tool assembly 1400, cutting tools 1430, 1432 and 1434 are at equidistant locations along the circumference of tool holder 1406. In alternative embodiments, cutting tools can be located along non-equidistant locations along the circumference of a tool holder.

Diamond cutters 1402, 1412 and 1418 can each be made of polycrystalline diamond (PCD) or a mono crystalline diamond (MCD). As described above, an MCD is formed of one continuous crystal which does not have grain boundaries. Therefore, use of MCD cutters does not leave grain boundary marks on a part. However, it can be difficult to produce MCD cutters at a high enough volume for some manufacturing applications. Therefore, in some applications PCD cutters can be used. In some embodiments, one or more diamond cutters 1402, 1412 and 1418 are made of an MCD and the remaining diamond cutters are made of a PCD. In one embodiment, an MCD cutter can be used to cut a majority portion of a feature on a part and one or more PCD cutter can be used to cut remaining portions of the feature. For example, diamond cutter 1418 can be made of an MCD and diamond cutters 1402 and 1412 can be made of PCD. Diamond cutters 1402, 1412 and 1418 can each have differently shaped cutting edges. As shown in cutting tool assembly 1400, diamond cutters 1402 and 1412 have curved cutting edges and diamond cutter 1418 has a straight cutting edge. In the configuration shown, cutting tool assembly 1400 can be used to cut a feature on a part having a straight edge cut by diamond cutter 1418 and two curved edged cut by diamond cutters 1402 and 1412.

Figure 14C:
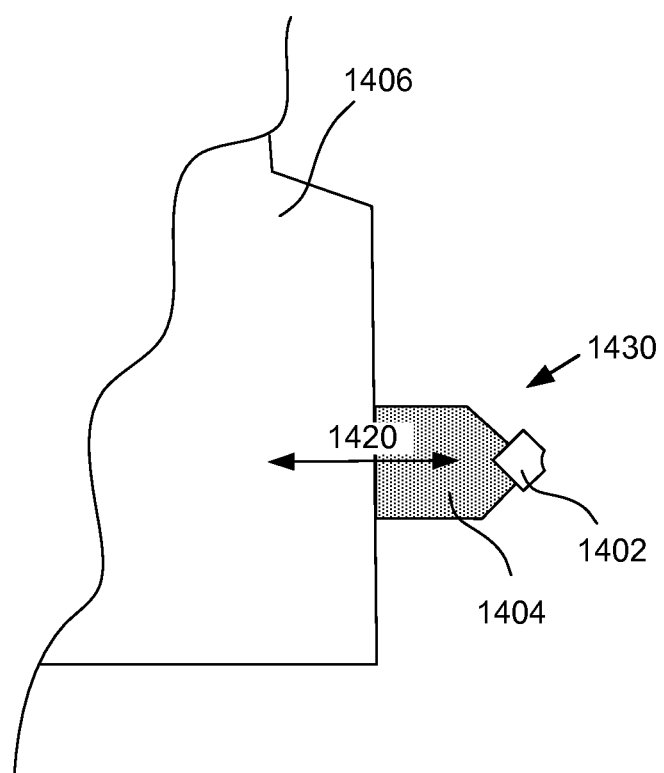
FIG. 14C illustrates a close up view of a cutting tool indicating a direction of adjustment within a tool holder.
Figure 15A:
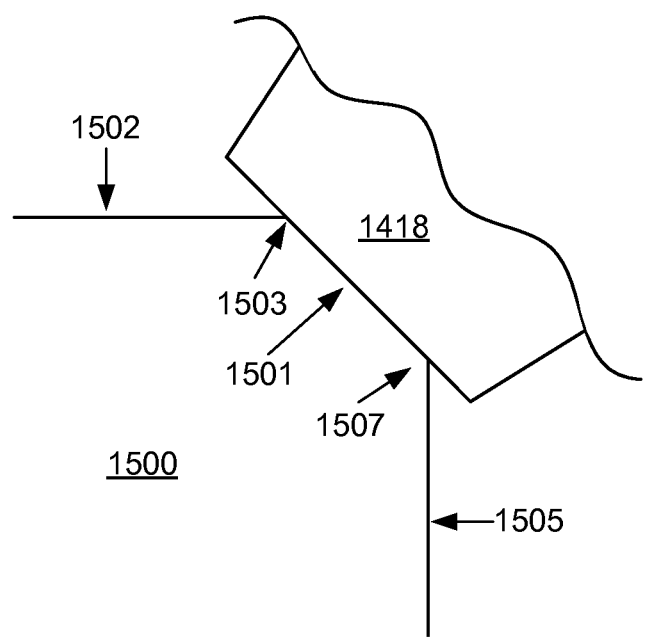
FIGS. 15A-15D show side views of a portion of a part undergoing a cutting process using the cutting tool assembly shown in FIGS. 14A-14C.
Figure 15B:
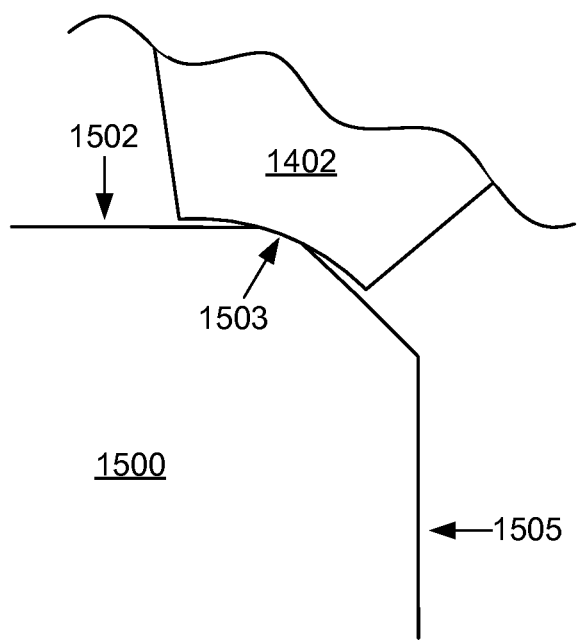
Figure 15C:
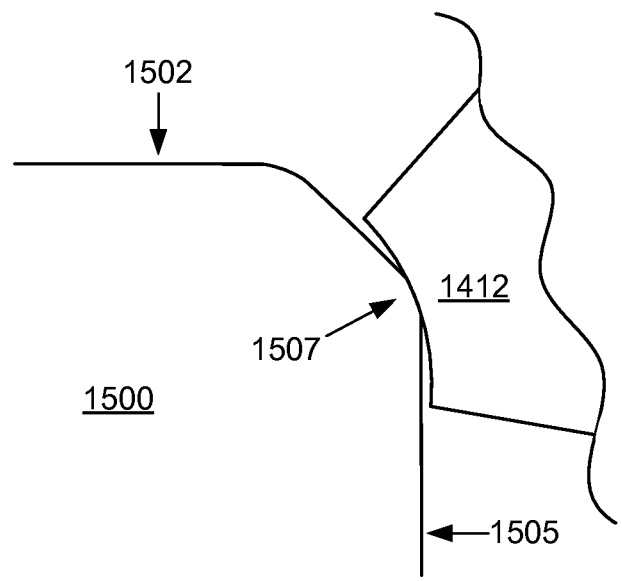
Figure 15D:
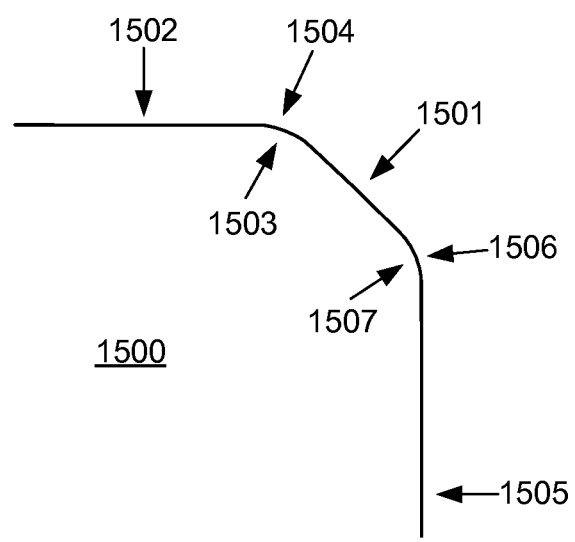

According to some embodiments, the positions of diamond cutters 1402, 1412 and 1418 within tool holder 1406 can be adjusted to change the shape of the feature on the part. To illustrate, FIG. 14C shows a close up view of cutting tool 1430 secured in tool holder 1406. As indicated by arrow 1420, in some embodiments cutting tool 1430 can be adjusted within tool holder 1406 in a lateral direction, or substantially perpendicular direction, in relation to axis 1410. In this way, the radial distance from axis 1410 and cutting tool 1430 can be adjusted. This radial distance determines the path that the cutting edge of diamond cutter 1402 follows during a cutting procedure, also referred to as the swing diameter. In some embodiments, cutting tools 1432 and 1434 can also be configured to be laterally adjusted within tool holder 1406 in relation to axis 1410. In this way, the swing diameter of each of cutting tools 1432 and 1434 can also be adjusted. These lateral adjustments can allow a user to control the amount of material that each of cutting tools 1430, 1432 and 1434 cut and adjust the shape of the cut feature on the part, as will be described in further detail below with reference to FIGS. 17 and 18.

As described above, cutting tool assembly 1400 can be used to form a feature on a part having a straight edge cut by diamond cutter 1418 and two curved edges cut by diamond cutters 1402 and 1412. FIGS. 15A-15D show side views of a portion of a part 1500 undergoing a cutting process using cutting tool assembly 1400. As described above, the cutting process involves rotating cutting tool assembly 1400 such that each of diamond cutters 1402, 1412 and 1418 contacts and cuts portions of part 1500. At 15A, an edge of part 1500 is cut by diamond cutter 1418. Since diamond cutter 1418 has a straight cutting edge, part 1500 is cut to form a straight or planar surface 1501. Planar surface 1501 can meet adjacent surface 1502 at junction region 1503. Likewise, planar surface 1501 can meet adjacent surface 1505 at junction region 1507. In some embodiments, cutting tool assembly 1400 is also translated along a part 1500 in a direction perpendicular to planar surface 1501 to elongate planar surface 1501. For instance, cutting tool assembly 1400 can be translated along the edge of part 1500 to create a chamfered edge.

At 15B, cutting tool assembly 1400 is rotated about axis 1410 such that one side of the chamfered edge of part 1500 is cut by diamond cutter 1402. Since diamond cutter 1402 has a curved cutting edge having a first cutting radius, part 1500 is cut to form a curved surface 1504 along junction region 1503 having a corresponding first radius. That is, diamond cutter 1402 can round junction region 1503. Diamond cutter 1402 can have concave shaped cutting edge, as shown, in order to round junction region 1503. In embodiments where the cutting tool assembly is also translated in a direction perpendicular to planar surface 1501, curved surface 1504 is elongated to form a curved chamfered edge. At 15C, cutting tool assembly 1400 is rotated further such that the other side of the chamfered edge of part 1500 is cut by diamond cutter 1412. Since diamond cutter 1412 has a curved cutting edge having a second cutting radius, part 1500 is cut to form a curved surface 1506 along junction region 1507 having a corresponding second radius. That is, diamond cutter 1412 can round junction region 1507. Diamond cutter 1412 can have concave shaped cutting edge, as shown, in order to round junction region 1507. In embodiments where the cutting tool assembly is also translated in a direction perpendicular to planar surface 1501, curved surface 1506 is elongated to form a curved chamfered edge. In the embodiment shown, the first cutting radius of diamond cutter 1402 is the same as the second radius of diamond cutter 1412. In other embodiments the cutting radiuses can be different. At 15D, the cutting procedure is complete with part 1500 having a chamfer with straight or planar surface 1501 and curved surfaces 1504 and 1506. In particular, junction regions 1503 and 1507 can be rounded so as to form a rounded chamfered edge. In embodiments where the cutting tool assembly is translated along an edge of part 1500, a chamfered with two curved edges is formed.

Figure 16:
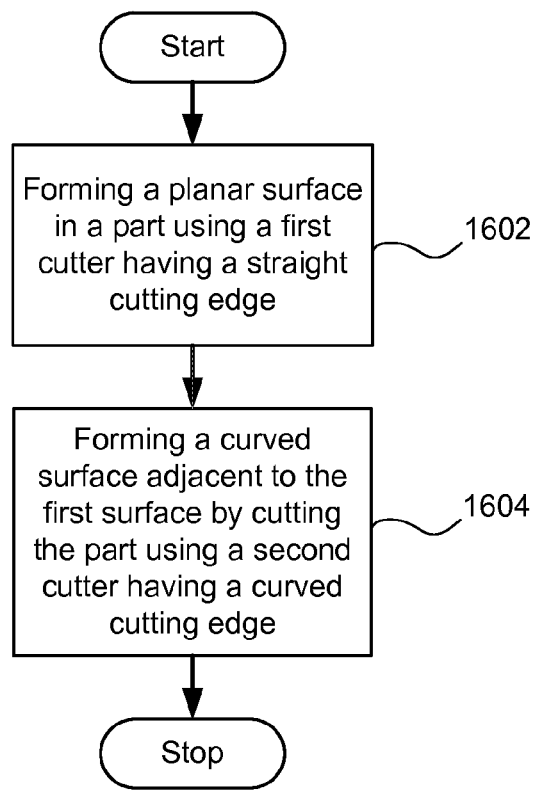
FIG. 16 is a flowchart illustrating a process for cutting a complex feature in a part in accordance with described embodiments.

FIG. 16 shows flowchart 1600 indicating process steps for cutting a complex feature in a part using a cutting tool assembly in accordance with some embodiments. The cutting tool assembly can include a tool holder and at least two cutters. At 1602, a planar surface is formed by cutting the part using a first cutter having a straight cutting edge. At 1604, a curved surface adjacent to the planar surface is formed by cutting the part using a second cutter. The second cutter can have a curved cutting edge characterized by having a radius of curvature. The curved surface has a curve with a radius corresponding to the radius of curvature of the curved cutting edge. As described above, the cutting can be performed using a milling process where the first and second cutters are positioned on the tool holder that is positioned in a milling machine. During the cutting process, the first and second cutters are rotated about a central axis. As described above, one or both of the first and second cutters can be made of diamond, such as MCD and PCD.

Figure 17:
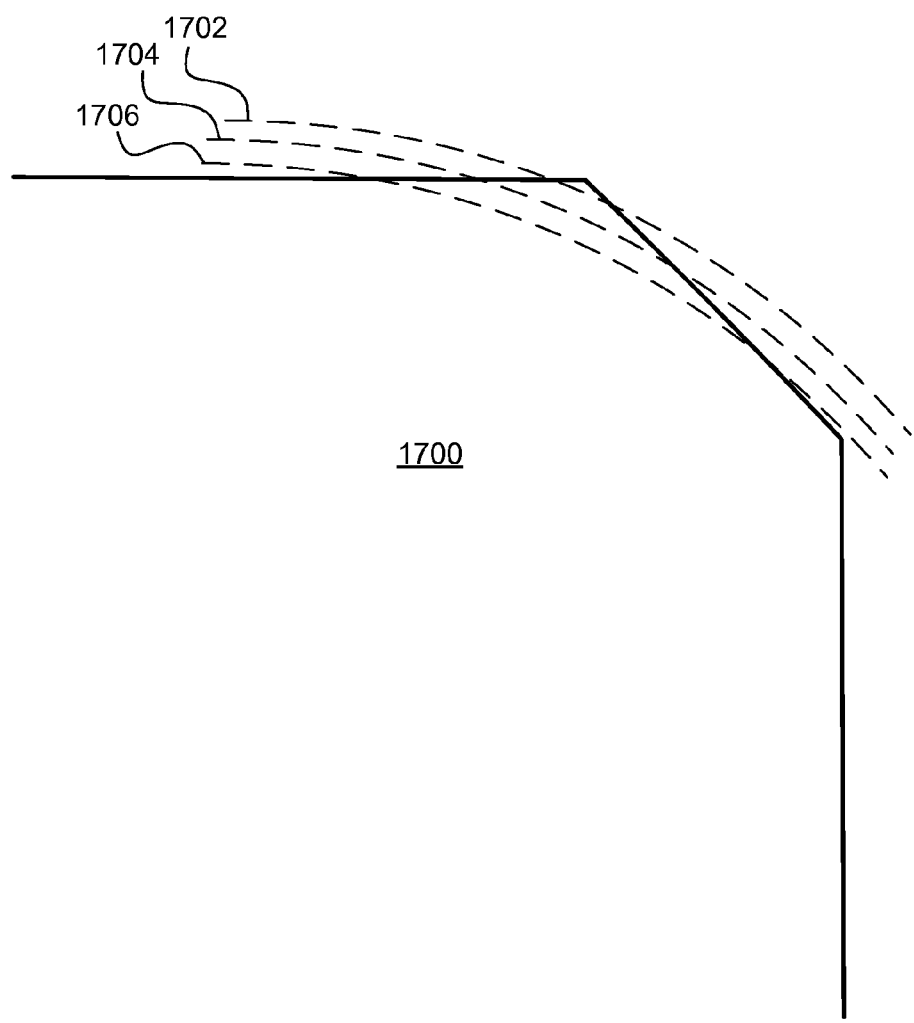
FIG. 17 shows a side view of a portion of a part indicating different cuts using different swing diameters of a cutting tool in accordance with described embodiments.

To change the shape or size of the feature, in some embodiments, the cutting tools can be adjusted in a lateral direction within a tool holder to change the distance between the cutting tool and the axis of rotation, as described above with reference to FIG. 14C. Note that in practice, it can also be important to also adjust the machining path when adjusting the swing diameter of a cutting tool in order to keep the shape of the radius of the cutting tool constant during the cutting process. The lateral adjustments can change the swing diameter of each of the cutting tools and the amount of material that each cutting tool cuts in a part. To illustrate, FIG. 17 shows a side view of a portion of part 1700 indicating different cuts 1702, 1704 and 1706 that a cutting tool can make depending upon the swing diameter of the cutting tool. Cuts 1702, 1704 and 1706, illustrated with dashed lines, indicate different cuts that a cutting tool can make on part 1700. As shown, cut 1702 corresponds to the cutting tool positioned within a tool holder to have a first swing diameter. Cut 1704 corresponds to the cutting tool adjusted within the tool holder to have a second swing diameter. As shown, cut 1704 cuts more material from part 1700 than cut 1702. Cut 1706 corresponds to the cutting tool adjusted within the tool holder to have a third swing diameter. As shown, cut 1706 cuts more material from part 1700 than cuts 1702 and 1704. The swing diameter of the cutting tool can be adjusted between cutting procedures. In this way, the amount of material cut from part 1700 and the shape of the feature can be adjusted to a desired shape and size.

Figure 18:
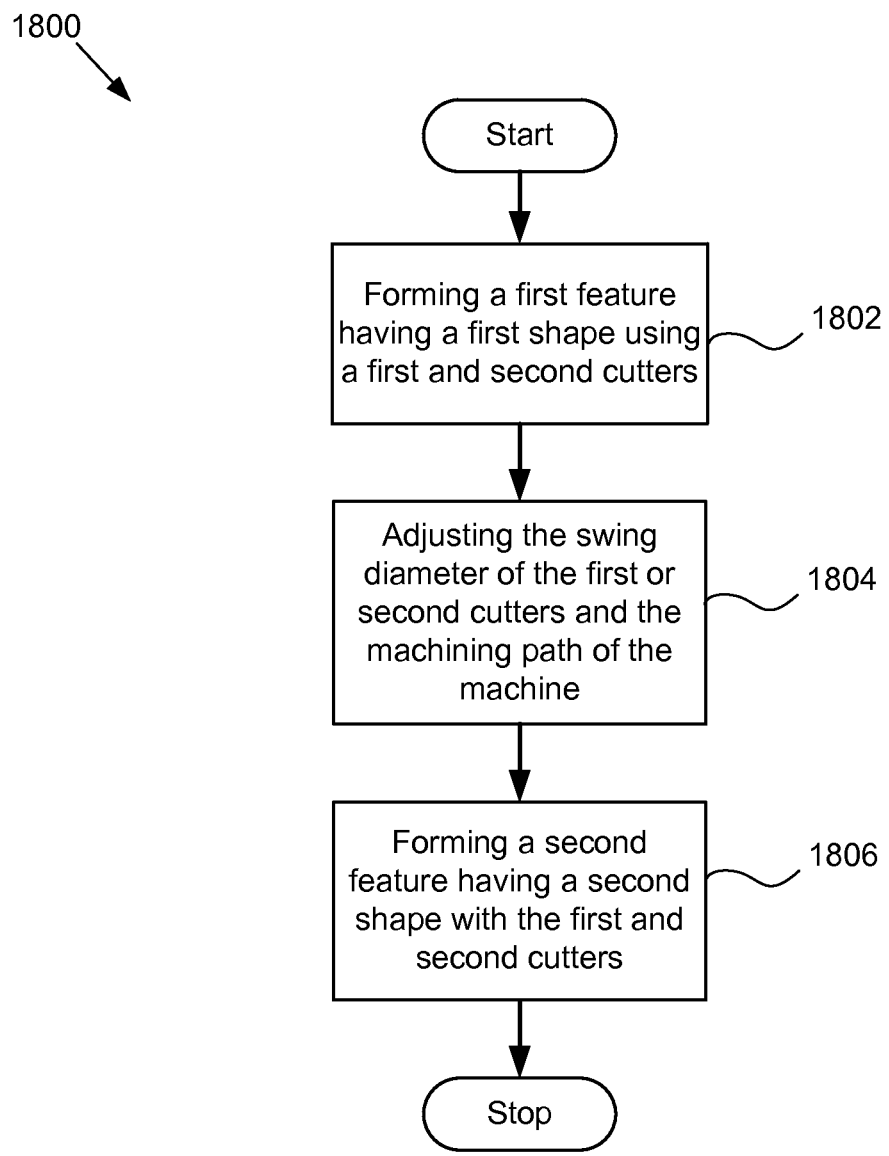
FIG. 18 is a flowchart illustrating a process for adjusting a shape of a feature cut into a part in accordance with described embodiments.

FIG. 18 shows flowchart 1800 indicating process steps for adjusting the shape of a feature in accordance with some embodiments. A cutting tool assembly which includes a tool holder and at least two cutting tools can be used. Each cutting tool can have a corresponding cutter. At 1802, a first feature having a first shape that is cut using a first cutter and a second cutter is formed. In one embodiment, the first shape can include a planar surface formed by a first cutter having a straight cutting edge and an adjacent curved surface formed by second cutter having a curved cutting edge. The curved cutting edge can have a curve radius to form a curved surface having a corresponding curve radius. As described above, the cutting can be performed using a milling process where the first and second cutting tools are positioned in a tool holder, which is in turn, positioned in a milling machine. During the cutting process, the first and second cutters can be rotated about a central axis of the milling machine. As described above, one or both of the first and second cutters can be made of diamond.

At 1804, the machining path and swing diameter of at least one of the first and second cutters is adjusted. In some embodiments, the swing diameter is adjusted by moving the position of one or both of the cutters in relation to axis of rotation. In one embodiment, the position of the cutters are moved by laterally adjusting one or more of the cutting tools within a tool holder, such as described with reference to FIG. 14C. For example, the second cutter having the curved cutting edge can be adjusted to have a larger swing diameter. The larger swing diameter will cause the second cutter to cut more material from the part. After the adjusting is complete, at 1806 a second feature having a second shape that is cut using the first cutter and the second cutter is formed. Since the positions of one or more of the cutters have changed, the first shape can be different than the second shape. In some embodiments, the same part is cut after the adjustment. In alternative embodiments, an uncut part is cut after the adjustment. Since at least one of the cutters has a different swing diameter, cutting the part will result in the second shape of the second feature to be different than the first shape of the first feature. In this way, a feature can be adjusted to form any suitable desired shape.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A cutting tool assembly arranged to perform a cutting operation along an edge of a part, comprising:
    a tool holder configured to rotate about an axis;
    a first cutting tool attached to the tool holder and comprising a first cutting edge, the first cutting edge having a straight cutting surface configured to cut a planar surface along the edge of the part, the planar surface meeting an adjacent surface at a junction region; and
    a second cutting tool attached to the tool holder and comprising a second cutting edge having a curved cutting surface, the curved cutting surface configured to round the junction region between the planar surface and the adjacent surface.

2. The cutting tool assembly of claim 1, wherein at least one of the first cutting tool or the second cutting tool is comprised of mono crystalline diamond.

3. The cutting tool assembly of claim 1, wherein at least one of the first cutting tool or the second cutting tool is comprised of poly crystalline diamond.

4. The cutting tool assembly of claim 1, further comprising:
a third cutting tool attached to the tool holder and comprising a third cutting edge having a second curved cutting surface, the second curved cutting surface configured to round a second junction region between the planar surface and a second adjacent surface of the part.

5. The cutting tool assembly of claim 4, wherein the curved cutting surface of the second cutting tool is characterized as having a first radius of curvature and the second curved cutting surface of the third cutting tool is characterized as having a second radius of curvature, wherein the first radius of curvature is the same as the second radius of curvature.

6. The cutting tool assembly of claim 1, wherein the first cutting tool comprises a first shank and a first cutter, wherein the second cutting tool comprises a second shank and a second cutter, wherein the first cutter is attached to the first shank and the second cutter is attached to the second shank.

7. The cutting tool assembly of claim 1, wherein the first cutting tool is at a first radial distance from the axis and the second cutting tool is at a second radial distance from the axis, the first radial distance is the same as the second radial distance.

8. The cutting tool assembly of claim 1, wherein the first cutting tool is at a first radial distance from the axis and the second cutting tool is at a second radial distance from the axis, the first radial distance is different than the second radial distance.

9. The cutting tool assembly of claim 1, wherein the cutting tool assembly is configured to operate with a computer numerical control (CNC) milling machine.

10. The cutting tool assembly of claim 1, wherein the first cutting tool and the second cutting tool are positioned at equidistant locations along a circumference of the tool holder.

11. A method of cutting along an edge of a part using a cutting tool assembly comprising a tool holder and a first cutting tool and a second cutting tool attached to the tool holder, the tool holder configured to rotate about an axis, the method comprising rotating the first cutting tool and second cutting tool about the axis such that:
the first cutting tool cuts a planar surface along the edge of the part the first cutting tool having a first cutting edge having a straight cutting surface, the planar surface meeting an adjacent surface at a junction region; and
the second cutting tool rounds the junction region between the planar surface and the adjacent surface, the second cutting tool having a second cutting edge having a curved cutting surface.

12. The method of claim 11, wherein one or both of the first cutting tool and the second cutting tool is a mono crystalline diamond cutter.

13. The method of claim 11, wherein one or both of the first cutting tool and the second cutting tool is a poly crystalline diamond cutter.

14. The method of claim 11, wherein the first cutting tool is at a first radial distance from the axis and the second cutting tool is at a second radial distance from the axis, the first radial distance is the same as the second radial distance.

15. The method of claim 11, wherein the first cutting tool is at a first radial distance from the axis and the second cutting tool is at a second radial distance from the axis, the first radial distance is different than the second radial distance.

16. The method of claim 11, wherein cutting along the edge comprises translating the cutting tool assembly along the edge of the part.

17. The method of claim 11, wherein the cutting tool assembly further comprises a third cutting tool attached to the tool holder, the method further comprising rotating the third cutting tool about the axis such that:
the third cutting tool rounds a second junction region between the planar surface and a second adjacent surface of the part, the third cutting tool having a third cutting edge having a second curved cutting surface.

18. The method of claim 17, wherein the curved cutting surface of the second cutting tool is characterized as having a first radius of curvature and the second curved cutting surface of the third cutting tool is characterized as having a second radius of curvature, wherein the first radius of curvature is the same as the second radius of curvature.

19. The method of claim 17, wherein cutting along the edge of the part forms a curved chamfer along the edge of the part.

20. A cutting tool assembly arranged to form a rounded chamfer along an edge of a part, comprising:
a tool holder that rotates a first cutter and a second cutter about an axis, the first cutter having a straight cutting edge and the second cutter having a curved cutting edge, wherein when the tool holder is rotated about the axis and translated along the edge of the part:
the first cutter cuts a planar surface along the edge, the planar surface meeting an adjacent surface at a junction region, and
the second cutter rounds the junction region between the planar surface and the adjacent surface.

21. The cutting tool assembly of claim 20, wherein the second cutter has a concave shaped cutting edge.

22. The cutting tool assembly of claim 20, wherein the second cutter is affixed to a shank that is adjustably coupled to the tool holder such that a radial distance of the second cutter with respect to the axis is adjustable.

23. The cutting tool assembly of claim 22, wherein adjusting the radial distance corresponds to adjusting an amount of rounding of the junction region.

* * * * *